(12) United States Patent
Kitabayashi et al.

(10) Patent No.: US 6,788,401 B1
(45) Date of Patent: Sep. 7, 2004

(54) LENS TESTING DEVICE AND TESTING SHEET

(75) Inventors: Masashi Kitabayashi, Suwa (JP); Koichi Kojima, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 101 days.

(21) Appl. No.: 10/189,601

(22) Filed: Jul. 8, 2002

(30) Foreign Application Priority Data

Aug. 22, 2001 (JP) ...................................... 2001-252096

(51) Int. Cl.$^7$ .............................................. G01B 9/00
(52) U.S. Cl. ...................................................... 356/124
(58) Field of Search ................................ 356/124–127

(56) References Cited

U.S. PATENT DOCUMENTS

| | | | | |
|---|---|---|---|---|
| 1,590,532 A | * | 6/1926 | Leonouvel | 356/239.1 |
| 3,100,239 A | * | 8/1963 | Courtney-Pratt | 356/124 |
| 3,743,427 A | * | 7/1973 | Weiser | 356/124.5 |
| 4,247,200 A | * | 1/1981 | Nohda et al. | 356/124 |
| 4,274,737 A | * | 6/1981 | Howland | 356/124.5 |
| 4,582,427 A | * | 4/1986 | Hutchin | 356/124.5 |
| 5,086,338 A | * | 2/1992 | Usui | 348/263 |
| 5,321,493 A | * | 6/1994 | Kamon | 356/124 |
| 5,726,746 A | * | 3/1998 | Park et al. | 356/124.5 |
| 6,177,986 B1 | * | 1/2001 | Stockton | 356/124 |

\* cited by examiner

*Primary Examiner*—Hoa Q. Pham
(74) *Attorney, Agent, or Firm*—Oliff & Berridge, PLC

(57) ABSTRACT

The present invention provides a lens inspection apparatus and an inspection sheet that make is possible to easily evaluate the resolution of a lens at low cost. A lens inspection apparatus can include an inspection sheet having a test pattern, a sliding holding portion for holding the inspection sheet, a light source for introducing a light beam into the test pattern of the inspection sheet held by the sliding holding portion, a rotary holding portion for holding the sliding holding portion so that the sliding holding portion can rotate in a plane, and a measuring section for capturing an image projected on a screen through the inspection sheet and a projection lens to be inspected, and subjecting the image to image processing. The test pattern has a measuring region in which linear light-shielding portions are arranged in stripes so as to achieve a predetermined spatial frequency. By rotating the rotary holding portion, the resolution of the test pattern, in which the light-shielding portions extend in different directions, can be easily evaluated. Accordingly, the invention makes it possible to simply evaluate the lens resolution at a low cost.

7 Claims, 14 Drawing Sheets

LENS TESTING DEVICE AND TESTING SHEET

BACKGROUND OF THE INVENTION

1. Field of Invention

The present invention relates a lens inspection apparatus and an inspection sheet.

2. Description of Related Art

Recently, projectors have been used which include a plurality of liquid crystal panels for modulating a plurality of colored light beams according to image information, a crossed dichroic prism for combining the colored light beams modulated by the corresponding liquid crystal panels, and a projection lens for enlarging and projecting the light beams combined by the prism so as to form a projection image. The optical characteristics, such as image resolution and chromatic aberration, of the projection lens used in the projectors sometimes vary, for example, depending on variations in the production processes. Since the variations in optical characteristics of the projection lens have an influence on the quality of the image displayed by the projector, the resolution of the lenses is evaluated before the lenses are shipped by the lens manufacturer and before the lenses are assembled into the projectors.

More specifically, a test pattern for resolution measurement is formed on an inspection sheet, image light containing the test pattern is introduced into a projection lens by irradiating the test pattern with light, and the image supplied from the projection lens is projected onto a screen. Then, the image of the test pattern projected on the screen is detected by an image capture apparatus using an image pickup device, such as a CCD (Charge Coupled Device), and the image detected by the apparatus is subjected to image processing by a computer or the like, thereby evaluating the resolution of the projection lens. Since the test pattern includes a plurality of small patterns of a predetermined size, the plurality of small patterns are projected on the screen. The image pickup device sequentially moves over the small pattern images projected on the screen, and captures the images at the corresponding positions.

SUMMARY OF THE INVENTION

Test patterns to be formed on known inspection sheets are quite small so that the outer size thereof is, for example, approximately 10.8 mm×14.4 mm. These test patterns can include a plurality of small patterns, as described above, and the outer size of the small patterns is even smaller, for example, 795 $\mu$m×1074 $\mu$m. Since the test patterns of the inspection sheets have such a quite fine structure, they are manufactured in a process similar to a semiconductor manufacturing process. That is, first, chromium (Cr) is evaporated onto a glass substrate after a mask having a predetermined test pattern is produced beforehand. Then, a photoresist (photosensitive resin) is applied on the chromium on the glass substrate, and is irradiated with ultraviolet rays through the above mask. Subsequently, portions of the photoresist irradiated with the ultraviolet rays are removed with a predetermined solvent. In this way, the mask is transferred onto the photoresist. By then subjecting the chromium to etching with the photoresist used as a mask, a chromium test pattern is formed on the glass substrate.

A plurality of types of inspection sheets are necessary in accordance with the outer sizes of liquid crystal panels used in the projector. Since a plurality of types of inspection sheets are manufactured through such a process, the cost of the inspection sheets is increased. Since the resolutions of a plurality of small patterns formed in the test pattern are evaluated while moving the image pickup device to the image positions of the small patterns, as described above, it takes a long time to move and place the image pickup device at predetermined positions, and fast inspection is impossible.

Accordingly, an object of the present invention is to provide a lens inspection apparatus and an inspection sheet that make it possible to easily evaluate the resolution of a lens at low cost.

A lens inspection apparatus of the present invention inspects a lens in order to evaluate the resolution of the lens by projecting image light containing a test pattern for resolution measurement onto a screen through the lens, and displaying an image of the test pattern for resolution measurement on the screen. The lens inspection apparatus can include an inspection sheet having the test pattern for resolution measurement, an inspection-sheet holder for holding the inspection sheet, a light source for introducing a light beam to the test pattern of the inspection sheet held by the inspection-sheet holder, and an image-light detecting section having an image pickup device for capturing an image projected on the screen through the inspection sheet. The test pattern can include a measuring region in which linear light-shielding portions are arranged in stripes in order for transmitted light to have a predetermined spatial frequency, and the inspection-sheet holder includes a holder body having a light-transmissive section corresponding to the test pattern of the inspection sheet for positioning the inspection sheet at a focal position of the lens, and a rotary holding portion for holding the inspection sheet so that the inspection sheet rotates in a plane relative to the holder body.

As the image pickup device, image pickup devices, such as CCDs and MOS (Metal Oxide Semiconductor) devices, may be used.

The image-light detection section may include the above-described image pickup device, an image data generating device, such as a video capture board, for receiving an output from the image pickup device and for converting the output into image signals for a computer, and a computer for processing the image signals. The computer may include a program running under an OS (Operating System) for controlling the operation of the computer, and the program may include, for example, a program for evaluating the resolution, the chromatic aberration, and the like.

While the predetermined spatial frequency may be arbitrarily determined, for example, it can be set to be within the range of 20 lines per millimeter to 80 lines per millimeter.

In the lens inspection apparatus of the present invention, for example, when a light beam is emitted from the light source after the inspection sheet is held in the inspection-sheet holder so that the light-shielding portions of the test pattern arranged in stripes extend in the vertical direction (upward-downward direction), the light beam travels through the inspection sheet and the projection lens, and a test pattern image in which the light-shielding portions extend in the vertical direction is projected onto the screen. By capturing the projected image with the image pickup device, and then detecting the captured image with the image detecting section, the resolution of the projection lens can be evaluated.

Next, the rotary holding portion can be rotated in a plane relative to the holder body, and is fixed at a position such that the direction of the light-shielding portions is different from the above direction (vertical direction). For example, the rotary holding portion is rotated by 90°, and is fixed so that the light-shielding portions extend in the horizontal direction (rightward-leftward direction). In this state, the resolution of the projection lens can be evaluated in a manner similar to the above.

By changing the orientation of the test pattern by rotating the rotary holding portion in a plane after loading the inspection sheet having the test pattern into the inspection-sheet holder, as described above, the resolution of the projection lens can be easily evaluated while one type of test pattern, in which the light-shielding portions extend in different directions, for example, in two directions, that is, the vertical direction and the horizontal direction, is projected onto the screen. In this way, the number of types of inspection sheets to be prepared can be reduced, and the cost of the inspection sheets can be reduced. In this case, simply by rotating the rotary holding portion, the resolution evaluation can be easily switched to a resolution evaluation with an inspection sheet in which the light-shielding portions extend in a different direction, and this can shorten the inspection time. In other words, the inspection operation can be simplified.

Preferably, the inspection-sheet holder has a sliding holding portion for holding a plurality of inspection sheets having test patterns of different spatial frequencies, and for holding the inspection sheets so that the inspection sheets can slide in a plane relative to the holder body. In such a configuration, by sliding the sliding holding portion while it holds a plurality of inspection sheets having test patterns of different spatial frequencies, an inspection sheet having a desired spatial frequency can be selected from a plurality of inspection sheets. Furthermore, the extending direction of the light-shielding portions in each inspection sheet can be selected by rotating the rotary holding portion, as described above. For this reason, for example, when two types of inspection sheets (test patterns) are placed in the sliding holding portion, the resolutions of at least four types of test pattern can be evaluated. Therefore, the number of inspection sheets to be prepared can be reduced, and the cost of the inspection sheets can be further reduced. In this case, it is possible to easily switch between the types of inspection sheets and to shorten the inspection time with a relatively simple structure for sliding and placing the inspection sheet using the sliding holding portion. This can simplify the inspection operation.

When the resolution of a general-purpose projection lens, which is not required to have a higher level of precision than necessary, is evaluated, it is satisfactory to inspect four types of test patterns in which the measuring region extends in the horizontal and vertical directions and the spatial frequency of the measuring region differs. For this reason, when the sliding holding portion is provided with two holding frames for holding an inspection sheet, and these two holding frames are slid by the sliding holding portion and are rotated by the rotary holding portion, inspection can be easily performed by using all four types of test without exchanging the inspection sheets simply by first precisely loading two types of inspection sheets in the two holding frames, respectively, and then operating the rotary holding portion and the sliding holding portion. Therefore, it is possible to simplify the inspection operation and to shorten the inspection time.

Preferably, the image-light detecting section includes a plurality of image pickup devices for capturing an image projected on the screen, and the plurality of image pickup devices are fixed to the screen. In such a configuration, by adjusting the position of the inspection sheet beforehand so that an image of the test pattern is properly projected onto the positions where the fixed image pickup devices perform detection, the image pickup device does not need to be moved to the test pattern images projected on the screen, which was necessary before, and therefore, the inspection time can be shortened.

The chromatic aberration of the lens can also be evaluated with such an inspection sheet for resolution evaluation. In this case, in order to evaluate the chromatic aberration of the lens, it is preferable that the lens inspection apparatus of the present invention have the following structure. In other words, first, the lens inspection apparatus may have a filter mounting portion in which color filters for transmitting only a light beam having a wavelength within a predetermined range from among the light beams emitted from the light source are mounted.

As the combinations of colors of such color filters, for example, a combination of three primary colors, red (R), green (G), and blue (B), or a combination of three complementary colors, cyan (C), magenta (M), and yellow (Y) may be adopted. The three primary colors provide higher color reproducibility, and the three complementary colors provide higher resolution. These three colors may be appropriately changed depending on the application and so on. The color filters are not limited to the above combination of three colors, but may have four or more colors or two colors or less.

In such a configuration, the chromatic aberration of the lens is evaluated, for example, in the following procedure. That is, first, the above-described color filters of three colors are prepared and are loaded in the filter mounting portion. Then, one of the three color filters is selected, and is placed in the optical path of a light beam from the light source. In this state, the light beam is emitted from the light source to the color filter, and a light beam having a frequency within a predetermined range passing through the color filter passes through a predetermined test pattern, and a test pattern image is projected on the screen. Subsequently, the image projected on the screen is captured by the image pickup device, and the position of the test pattern in the captured image is stored in the image-light detecting section. Next, a color filter of another color is placed in the optical path, and the position of the test pattern is stored in a manner similar to the above. The position of the test pattern for the remaining color is similarly stored. The stored test pattern positions for the corresponding color filters are subjected to pattern matching, thereby evaluating the chromatic aberration.

Accordingly, the chromatic aberration of the lens can be easily evaluated simply by mounting the color filters in the filter mounting portion and alternatively placing these color filters in the optical path of the light beam from the light source. Since the filter mounting portion has a structure in which color filters, which are cheaper than the image pickup device, are simply placed in the optical path, it can be easily produced. Therefore, the filter mounting portion, as well as the color filters, can be cheaply produced, and the cost of evaluating the chromatic aberration of the lens can be reduced.

Second, in the lens inspection apparatus, the image-light detecting section may be provided with a prism for separating the image light projected on the screen into a plurality of colored light beams, and the image pickup device may be placed at each light-emergent end face of the prism corresponding to the colored light beams.

In such a configuration, the chromatic aberration of the lens is evaluated, for example, in the following procedure.

That is, a light beam emitted from the light source passes through a predetermined test pattern without passing through the above-described color filters so as to project a test pattern image onto the screen. The projected test pattern image is separated into color light images by the prism. Subsequently, images corresponding to the separated colored light beams are substantially simultaneously captured by the image pickup devices, and the images corresponding to the colored light beams captured by the image pickup devices are stored and are subjected to pattern matching by the image-light detecting section, thereby evaluating the chromatic aberration of the lens.

Since the images corresponding to the colored light beams are simultaneously captured by the image pickup devices in this way, it is unnecessary to exchange the color filters, which is necessary in the above-described case using the color filters, and this can shorten the time taken to measure the chromatic aberration of the lens.

An inspection sheet of the present invention is a rectangular inspection sheet that has a test pattern for resolution measurement on the upper surface thereof and that is placed on the upstream side of a lens in the optical path so as to evaluate the resolution of the lens by projecting image light containing the test pattern for resolution measurement onto a screen through the lens, and displaying an image of the test pattern for resolution measurement on the screen. The inspection sheet has a measuring region in which a plurality of linear light-shielding portions are arranged in stripes between a pair of opposing edges.

In the present invention, since a plurality of linear light-shielding portions are formed in stripes as the measuring regions between a pair of opposing edges, by setting the outer size of the test pattern including these measuring regions to be, for example, equal to or more than the size of the largest liquid crystal panel to be used in projectors, a single inspection sheet can also function as a plurality of types of inspection sheets having different outer sizes, regardless of the outer size of the liquid crystal panel, and the cost of the inspection sheet can be reduced. In this case, since the inspection sheet can be used as a plurality of inspection sheets, it does not need to be replaced even when the outer size of the liquid crystal panel changes when replacing the lens to be inspected. Therefore, the inspection time can be easily shortened. In other words, the inspection operation can be simplified.

Preferably, a plurality of measuring regions are arranged in the extending direction of the pair of edges, and a light-transmissive region that does not have the light-shielding portions is formed between the adjoining measuring regions.

An MTF (Modulation Transfer Function) may be used as a resolution evaluation value for evaluating the resolution of the lens. When it is assumed that the maximum detected brightness of the test pattern image is Imax, the minimum brightness is Imin, and the brightness of a background portion in which the test pattern is not formed is Io, the MTF is found from:

$$MTF=(Imax-Imin)/(Io\times2-Imax-Imin) \quad \text{[Equation 1]}$$

When the MTF serving as the resolution evaluation value can be measured according to Equation 1, a proper MTF, which does not include the offset in the data generating device, can be found.

Therefore, in the above configuration, since the maximum and minimum brightnesses can be detected at the measuring regions, and the brightness of the background portion can be detected at the light-transmissive region, the MTF serving as the resolution evaluation value can be found from Equation 1. For this reason, the resolution of the projection lens can be more accurately evaluated without being influenced by the model of the projector, the position on the display image, and the like.

BRIEF DESCRIPTION OF THE DRAWINGS

The invention will be described with reference to the accompanying drawings wherein like numbers reference like elements, and wherein.

DETAILED DESCRIPTION OF PREFERRED EMBODIMENTS

Figure 1:
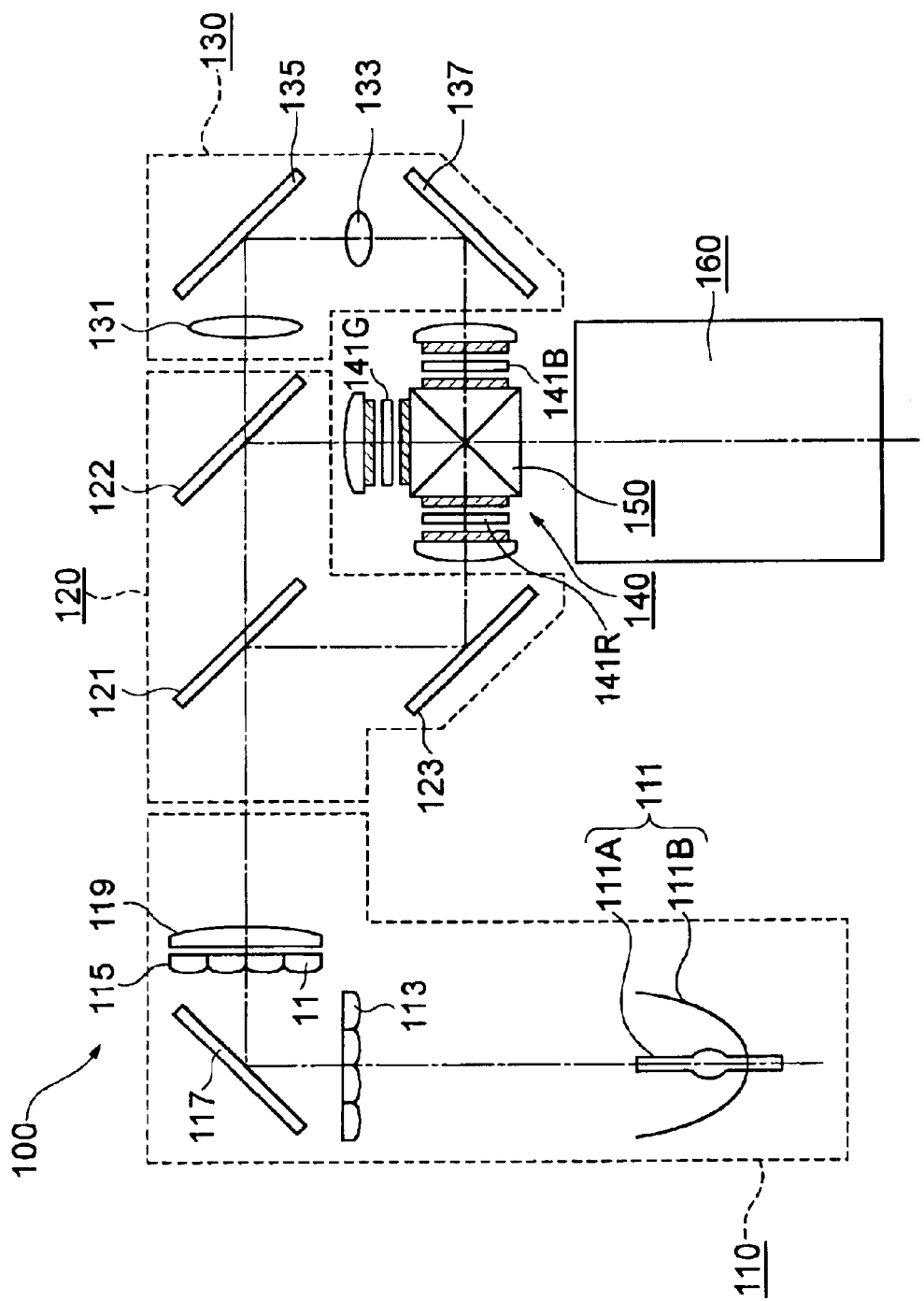
FIG. 1 is a schematic view showing the configuration of a projector including a projection lens to be inspected in embodiments of the present invention.

A first embodiment of the present invention will be described below with reference to the drawings. FIG. 1 shows an exemplary configuration of a projector 100 incorporating a projection lens. The projector 100 includes an integrator illumination optical system 110, a color-separating optical system 120, a relay optical system 130, an electrooptic device 140, a crossed dichroic prism 150 serving as a color-combining optical system, and a projection lens 160 serving as a projection optical system.

The integrator illumination optical system 10 includes a light source device 111 having a light-source lamp 111A and a reflector 111B, a first lens array 113, a second lens array 115, a reflecting mirror 117, and a superimposing lens 119. A light beam emitted from the light-source lamp 111A is reflected by the reflector 111B in one direction, is divided into a plurality of partial beams by the first lens array 113, is bent by the reflecting mirror 117 so as to change the emitting direction by 90°, and is focused near the second lens array 115. The partial beams emitted from the second lens array 115 enter the subsequent superimposing lens 119 so that the center axes thereof (principal rays) are perpendicular to the incident surface of the superimposing lens 119, and the partial beams emitted from the superimposing lens 119 are superimposed on three liquid crystal panels 141R, 141G, and 141B that constitute the electrooptic device 140.

The color-separating optical system 120 includes two dichroic mirrors 121 and 122, and a reflecting mirror 123, and has a function of separating a plurality of partial beams emitted from the integrator illumination optical system 110 into colored light beams of three colors, red, green, and blue, by using these mirrors 121, 122, and 123. The relay optical system 130 includes an incident-side lens 131, a relay lens 133, and reflecting mirrors 135 and 137, and has a function of guiding color light separated by the color-separating optical system 120, for example, blue light, to the liquid crystal panel 141B.

The electrooptic device 140 includes three liquid crystal panels 141R, 141G, and 141B which use, for example, a polysilicon TFT as a switching element. Colored light beams separated by the color-separating optical system 120 are modulated by the three liquid crystal panels 141R, 141G, and 141B according to image information, thereby forming optical images.

The crossed dichroic prism 150 serving as the color-combining optical system combines images modulated by and emitted from the three corresponding liquid crystal panels 141R, 141G, and 141B so as to form a color image. The color image combined by the crossed dichroic prism 150 is emitted from the projection lens 160, and is enlarged and projected onto a screen or the like.

Figure 2:
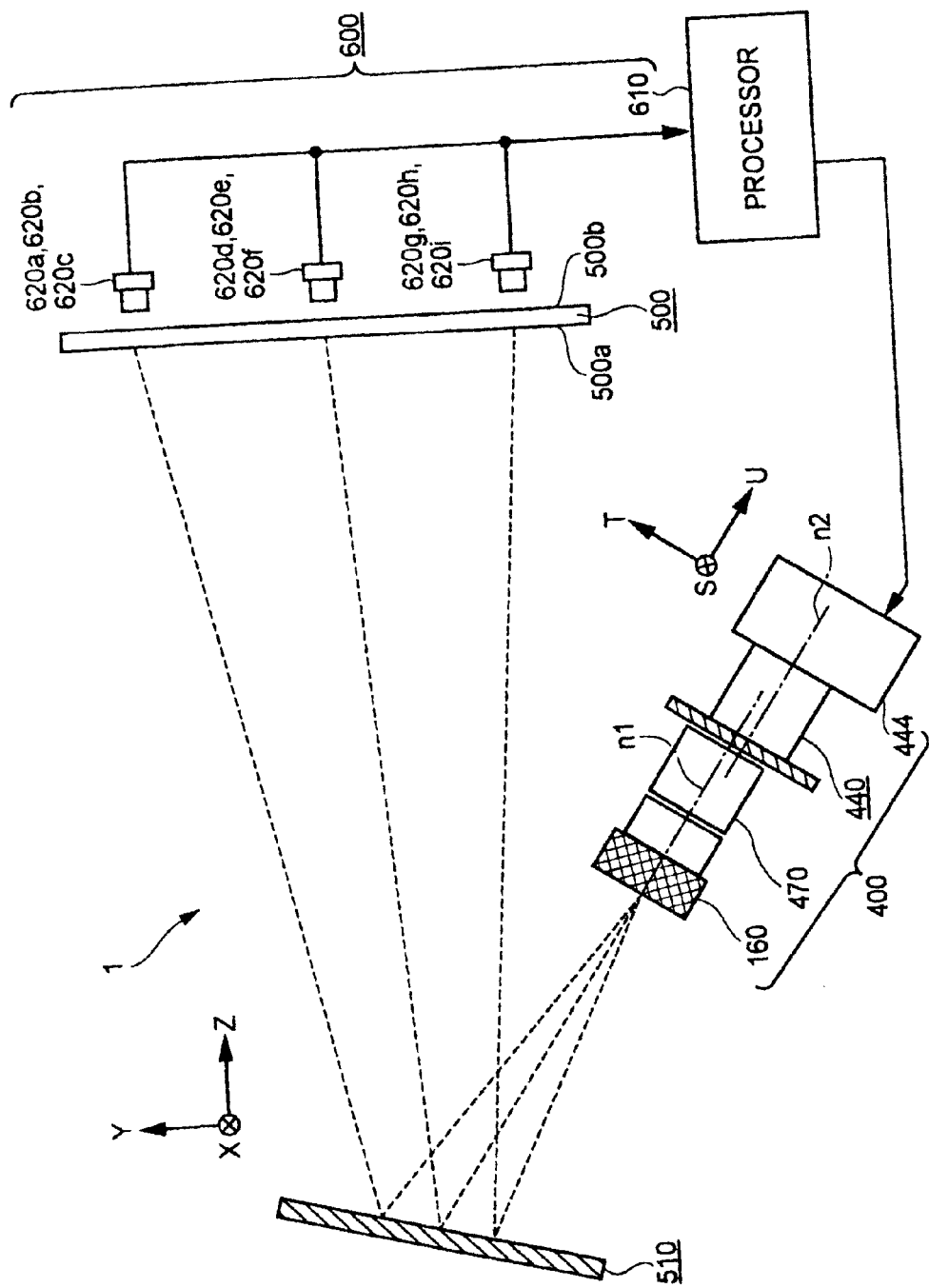
FIG. 2 is a schematic view showing the configuration of a projection-lens inspection apparatus according to a first embodiment of the present invention.

FIG. 2 shows an exemplary projection-lens inspection apparatus 1 according to a first embodiment of the present invention. The projection-lens inspection apparatus 1 serves to inspect a projection lens 160 used in the projector 100 shown in FIG. 1. As shown in FIG. 2, the projection-lens inspection apparatus 1 of the first embodiment includes a projecting section 400 in which a projection lens 160 to be inspected is mounted, a mirror 510, a screen 500, and a measuring section 600 serving as an image-light detecting section. In the projection-lens inspection apparatus 1, the projection lens 160 is detachable, and can be easily replaced with another projection lens.

Image light (light representing an image) emitted from the projecting section 400 is reflected by the mirror 510, and is projected onto the screen 500. The screen 500 is a transmissive screen that allows image light to be viewed from the side of a back surface 500b opposite from a projection surface 500a on which the image light is projected. The measuring section 600 inspects the projection lens 160 for resolution, chromatic aberration, and the like, with reference to the image projected on the screen 500.

In the following description, as shown in FIG. 2, the projection-lens inspection apparatus 1 is described using an XYZ rectangular coordinate system having an XY plane in parallel with the projection surface 500a of the screen 500. The projection lens 160 is held by a holding device (not shown) so that it is at a predetermined angle with respect to an XZ plane. For this reason, in the following description, the projecting section 400 is described using a STU rectangular coordinate system obtained by turning the XYZ rectangular coordinate system about the X-axis by the above predetermined angle. The center axis n1 of the projection lens 160 is in parallel with a SU plane.

Figure 3:
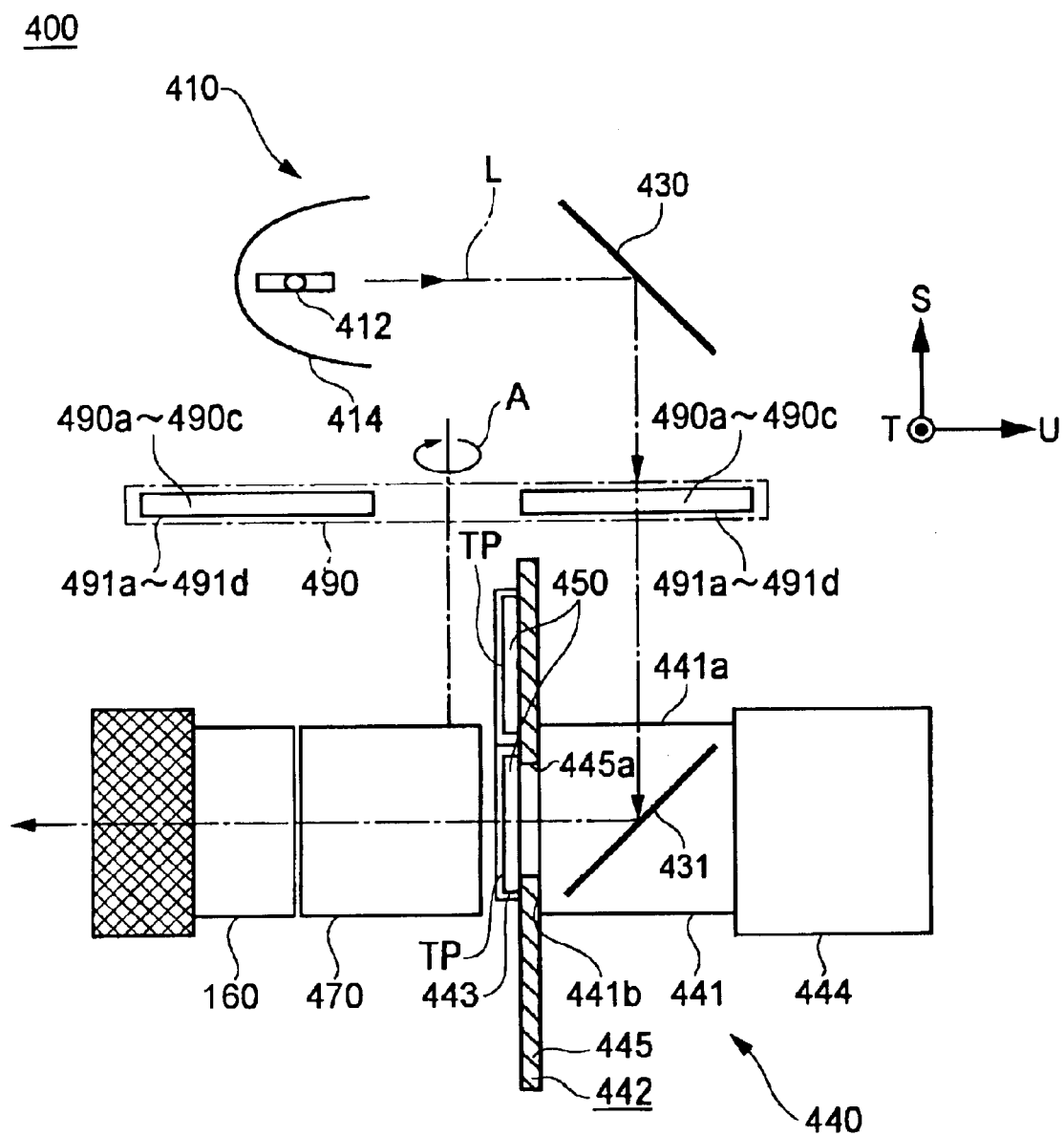
FIG. 3 is a schematic view showing the configuration of the projection-lens inspection apparatus of the first embodiment.

FIG. 3 is a view of the projecting section 400 shown in FIG. 2, as viewed from the +T direction. As shown in FIG. 3, the projecting section 400 can include, besides the projection lens 160, a light-source device 410, first and second mirrors 430 and 431, an inspection sheet 450, an inspection-sheet holder 440 for holding the inspection sheet 450, a dummy prism 470, a filter mounting portion 490, and color filters 490a to 490c to be mounted in the filter mounting portion 490.

As shown in FIG. 3, a light beam, which is substantially similar to a light beam for the projection lens 160 used in the projector 100 in FIG. 1, enters the projection lens 160 in the projecting section 400. In other words, the light-source device 410 corresponds to the light-source device 111 in FIG. 1, the inspection sheet 450 corresponds to the liquid crystal panels 141R, 141G, and 141B in FIG. 1, and the dummy prism 470 corresponds to the crossed dichroic prism 150 in FIG. 1. The inspection apparatus 1 having such a projecting section 400 allows the projection lens 160 to be inspected in an environment similar to that in the case in which the projection lens 160 is used in the projector 100.

The light-source device 410 introduces a light beam to the inspection sheet 450, and includes a parabolic reflector 414 having a concave surface shaped like a paraboloid of revolution, and a light-source lamp 412 disposed near the focal position of the paraboloid of revolution of the parabolic reflector 414. In such a light-source device 410, light emitted from the light-source lamp 412 is reflected by the parabolic reflector 414, is emitted as a substantially parallel beam, and travels along the optical path L. As the light-source lamp 412, for example, a metal halide lamp or a high-pressure mercury lamp may be used. The parabolic reflector 414 is formed, for example, by forming a reflective film, such as a dielectric multilayer film or a metal film, on a concave surface of a paraboloid of revolution made of glass ceramics.

The first and second mirrors 430 and 431 function as light guide means that reflect a light beam emitted from the light-source device 410 and guide the light beam from the light-source device 410 to the projection lens 160 through the inspection sheet 450, and are formed of a substantially rectangular mirror. As the first and second mirrors 430 and 431, for example, a mirror with a dielectric multilayer film for reflecting light beams of all colors, or a metal mirror may be used.

Figure 4:
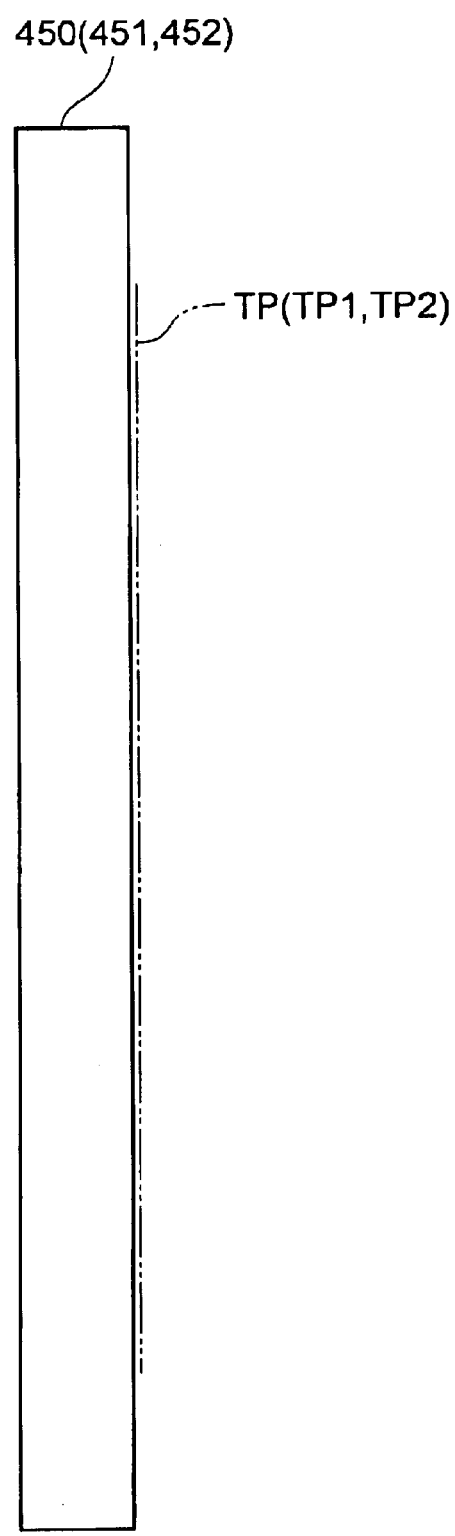
FIG. 4 is a side view of an inspection sheet in the embodiments.

As shown in FIG. 4, the inspection sheet 450 is made of a light-transmissive material, such as glass, and has a predetermined thickness (for example, 1.1 mm). A test pattern TP is formed on a front face (right side face in FIG. 4) of a substantially square base thereof so as to measure the resolution and chromatic aberration of the projection lens 160.

Figure 5:
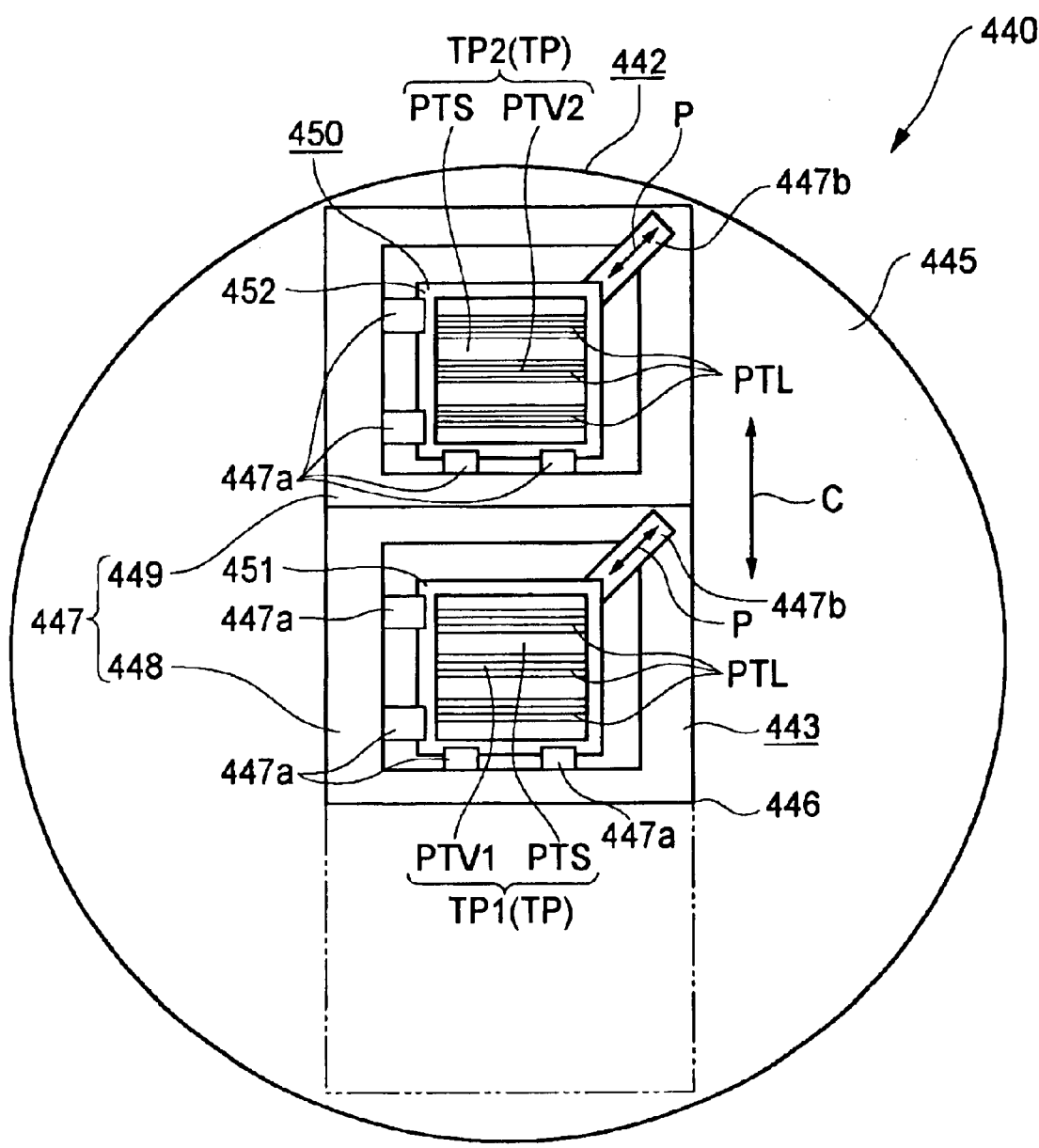
FIG. 5 is a front view of a rotary holding portion and a sliding holding portion in the embodiments.

The test pattern TP is substantially square, as shown in FIG. 5, and the outer size thereof is larger than that of the liquid crystal panels 141R, 141G, and 141B that constitute the projector 100. The outer size of the test pattern TP is set to be larger than the outer size of the largest liquid crystal panel to be used in all models of projectors.

Two types of inspection sheets 451 and 452 that are different in the shape of the test pattern TP are adopted as the inspection sheet 450, as shown in FIG. 5. The first inspection sheet 451 has a test pattern TPl, and the second inspection sheet 452 has a test pattern TP2.

As shown in FIG. 5, the test pattern TP1 has stripe-shaped measuring regions PTV1 in which a plurality of linear light-shielding portions PTL horizontally extending between a pair of right and left opposing edges are arranged so as to achieve a spatial frequency 50 lines per millimeter. The measuring regions PTV1 are arranged with a space therebetween, and a light-transmissive region PTS having no light-shielding portions PTL are formed between the adjoining measuring regions PTV1.

The test pattern TP2 also has, as shown in FIG. 5, stripe-shaped measuring regions PTV2 in which a plurality of linear light-shielding portions PTL horizontally extending between a pair of right and left opposing edges are arranged so as to achieve a spatial frequency 80 lines per millimeter. The measuring regions PTV2 are also arranged with a space therebetween, and a light-transmissive region PTS is formed between the adjoining measuring regions PTV2.

Referring again to FIG. 3, the inspection-sheet holder 440 serves to hold the inspection sheet 450 at a predetermined position, and includes a holder body 441 in which the second mirror 431 is disposed, a rotary holding portion 442 mounted on a –U side face (left side face in FIG. 3) of the holder body 441, a sliding holding portion 443 mounted on a –U side face of the rotary holding portion 442 so as to hold the inspection sheet 450, and a hexaxial adjusting portion 444 fixed to a +U side face (right side face in FIG. 3) of the holder body 441.

The holder body 441 is a box-shaped member having an opening 441a formed in a +S side face (upper side face in FIG. 3), and an opening 441b formed in the –U side face. The holder body 441 introduces a light beam from the light-source device 410 to the second mirror 431 through the opening 441a, and introduces the light beam reflected by the second mirror 431 to the test pattern TP (FIG. 4) of the inspection sheet 450 held by the sliding holding portion 443 through the opening 441b. A plurality of louver pieces (not shown) are formed outside the opening 441a in the –U side face of the holder body 441, and the rotary holding portion 442 is mounted on the –U side face of the holder body 441 with these louver pieces therebetween.

The rotary holding portion 442 is a member that holds the sliding holding portion 443 with the inspection sheet 450 held therein so that the sliding holding portion 443 can rotate in a plane relative to the holder body 441. The rotary holding portion 442 includes a rotary-holding-portion body 445 on which the sliding holding portion 443 is mounted, and rotary-holding-portion engaging pieces (not shown) formed on a surface of the rotary-holding-portion body 445 opposite from the surface having the sliding holding portion 443 so as to be engaged with the louver pieces of the holder body 441.

Figure 6:
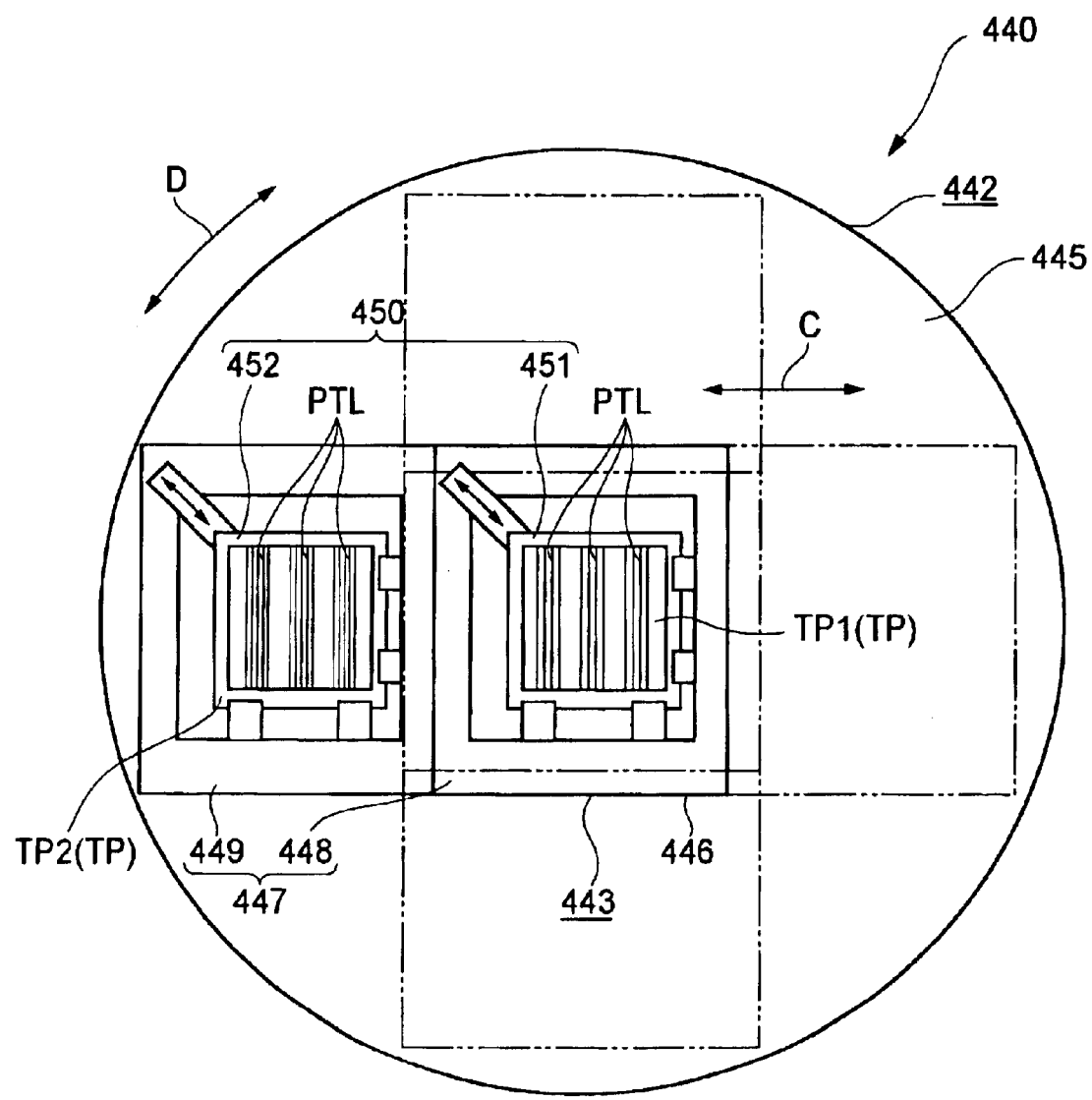
FIG. 6 is a view showing a state in which the rotary holding portion shown in FIG. 5 is rotated by 90°.

As shown in FIGS. 5 and 6, the rotary-holding-portion body 445 is shaped nearly like a circular disk, and a rectangular light-transmissive portion 445a (FIG. 3) is formed at the center of the circular disk corresponding to the test pattern TP of the inspection sheet 450. The rotary-holding-portion engaging pieces are engaged with the louver pieces of the holder body 441, and the rotary-holding-portion body 445 including the sliding holding portion 443 rotates relative to the holder body 441 by 90° in the direction shown by arrow D in FIG. 6 through the engagement. The light-transmissive section can include not only the light-transmissive portion 445a, but also the opening 441b of the holder body 441.

As shown in FIG. 5, the sliding holding portion 443 includes sliding portions 446, and a holding frame 447 for holding two inspection sheets 451 and 452. The sliding portions 446 and the holding frame 447 are engaged with each other so that the inspection sheets 451 and 452 are held so as to slide in a plane of the rotary-holding-portion body 445 relative to the holder body 441.

The holding frame 447 can include a first holding frame 448 and a second holding frame 449 that have the same rectangular shape and are placed next to each other in the sliding direction, as shown in FIGS. 5 and 6. Each of the holding frames 448 and 449 is a member that has a rectangular opening (not shown) for admitting a light beam from the light-source device 410, and that holds the test pattern TP (TP1, TP2) of the inspection sheet 450 (451, 452) at a predetermined position with respect to the opening.

Each of the holding frames 448 and 449 includes fixed holding pieces 447a for clamping a lower left portion of the inspection sheet 451 or 452 in FIG. 5 in which the test pattern TP (TP1, TP2) is not formed, and a movable holding piece 447b for clamping the upper right corner of the inspection sheet 451 or 452 in which the test pattern TP (TP1, TP2) is not formed. The movable holding piece 447b is movable in the direction shown by arrow P in the figure, and allows the inspection sheet 450 (451, 452) to be reliably attached to and detached from the holding frame 447 (448, 449).

Although not clearly shown in FIGS. 5 and 6, the sliding portions 446 are rail-shaped louver portions to be engaged with the edges of the holding frame 447 in a direction orthogonal to the sliding direction. The edges of the holding frame 447 move while engaged with the louver portions in the rail direction, thereby sliding the holding frame 447 in a plane of the rotary-holding-portion body 445 in the direction shown by arrow C. One of the first holding frame 448 and the second holding frame 449 is fixed to the light-transmissive portion 445a (FIG. 3). That is, one of the inspection sheets 451 and 452 are exchanged at the light-transmissive portion 445a. None of the inspection sheets 451 and 452 may be placed at the light-transmissive portion 445a.

As described above, since the rotary holding portion 442 can rotate by 90°, as shown by arrow D in FIG. 6, the inspection sheets 451 and 452 placed in the holding frames 448 and 449 also rotate by 90° in correlation with the 90° rotation of the rotary holding portion 442 in this case. Therefore, as shown in FIG. 6, the light-shielding portions PTL of the test pattern TP1 or TP2 are changed from a horizontally extending state to a vertically extending state at the light-transmissive portion 445a (FIG. 3).

From the above, the inspection sheets 451 and 452 are placed at the light-transmissive portion 445a in states in which the light-shielding portions PTL of the test patterns TP1 and TP2 extend in two directions, that is, the horizontal and vertical directions. In short, two types of test patterns TP, in which the light-shielding portions PTL extend in two directions, that is, a total of four types of test patterns TP, are placed at the light-transmissive portion 445a.

Referring again to FIG. 3, the hexaxial adjusting portion 444 can be formed of a combination of six movable stages including stages that can move in parallel in the S-, T-, and U-directions in FIG. 3, and stages that can rotate about the S-, T-, and U-axes, and serves to adjust the spatial position of the holder body 441 fixed to the –U side face thereof. In other words, since the spatial position of the holder body 441 is adjusted by controlling the hexaxial adjusting portion 444, the spatial position of the inspection sheet 450 held by the holder body 441 is adjusted. Consequently, the inspection sheet 450 is positioned at the focal position of the projection lens 160.

Figure 7:
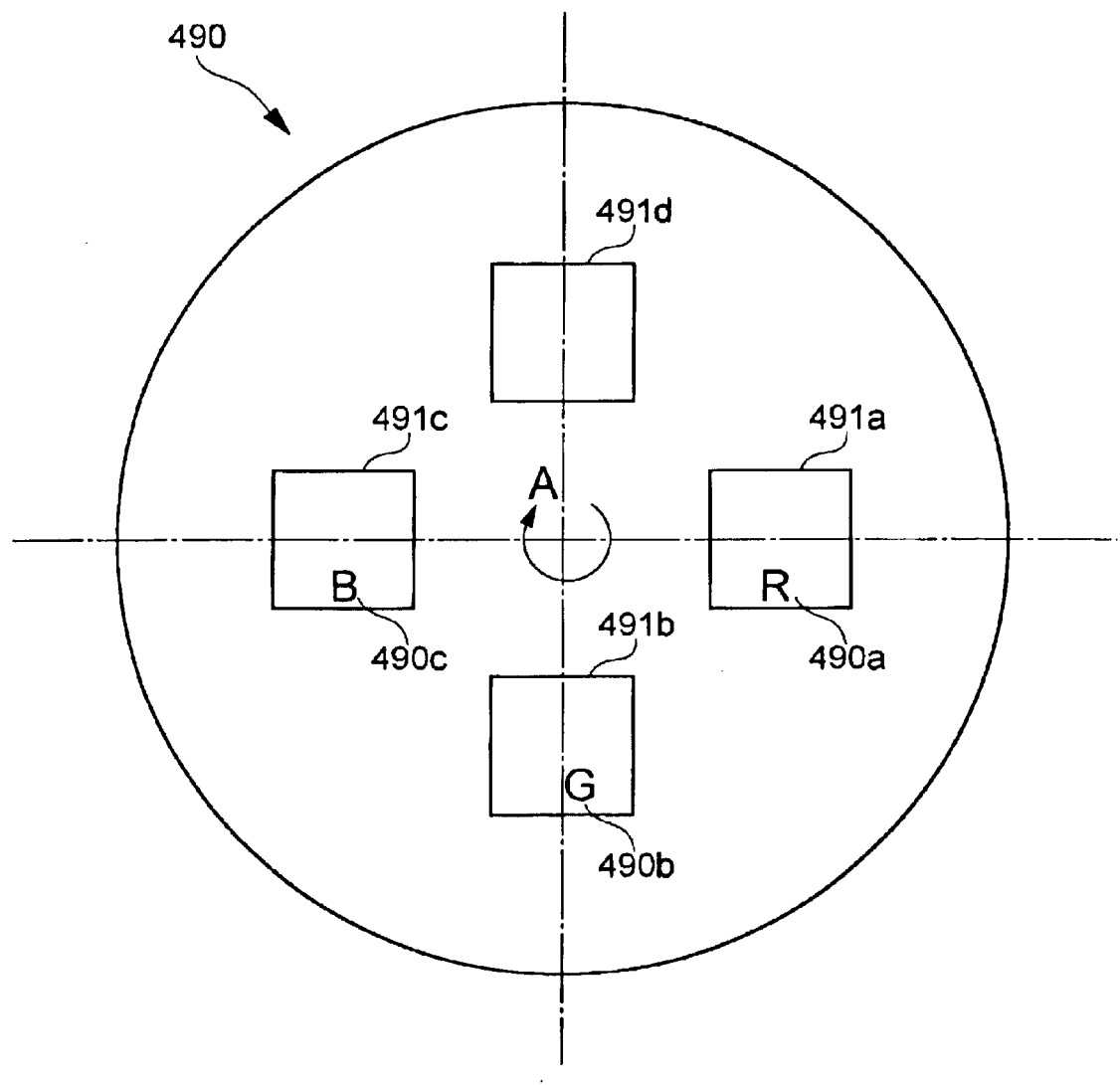
FIG. 7 is a plan view of a filter mounting portion in the first embodiment.

As shown in FIGS. 3 and 7, the filter mounting portion 490 is a substantially circular member in plan view, and can mount therein color filters 490a to 490c which have three primary colors of red (R), green (G), and blue (B) and each of which transmits only a light beam having a frequency within a predetermined range. Four square holes 491a to 491d are equally spaced in the filter mounting portion 490. The color filters 490a to 490c are loaded in three square holes 491a to 491c of the four square holes 491a to 491d, and a filter is not loaded in the remaining square hole 491d for white light.

The filter mounting portion 490 can rotate in the direction shown by arrow A so that any of the four square holes 491a to 491d is aligned with the optical path L of light emitted from the light-source device 410. For this reason, any of the color filters 490a to 490c loaded in the square holes 491a to 491c is placed in the optical path L by rotating the filter mounting portion 490 in the direction shown by arrow A. Furthermore, none of the color filters 490a to 490c may be placed in the optical path L.

The dummy prism 470 is provided to simulate the crossed dichroic prism 150 of the projector 100 shown in FIG. 1. Inside the crossed dichroic prism 150 shown in FIG. 1, an X-shaped thin film is formed so as to combine light beams emitted from the three liquid crystal panels 141R, 141G, and 141B. Since the thin film is unnecessary in the inspection apparatus 1, a member formed by covering a glass member, which is cubic like the crossed dichroic prism 150, with an antireflection coating is used as the dummy prism 470.

Although not particularly shown, projection lenses 160 to be inspected are formed of a unit having a projection lens body, and a lens holder for holding the projection lens body. The projection lenses 160 are sequentially mounted in the projection-lens inspection apparatus 1 in a unit form. This simplifies replacing operation, and shortens the inspection time.

In the above-described configuration of the projecting section 400, a light beam emitted from the light-source device 410 is reflected by the first mirror 430, passes through the filter mounting portion 490, and is reflected by the second mirror 431, as shown by the optical path L in FIG. 3. The light reflected by the second mirror 431 passes through the inspection sheet 450 (451, 452), and is thereby emitted as image light representing an image of the test pattern TP (TP1, TP2 in FIG. 5). The image light passes through the dummy prism 470, and is then projected onto the screen 500 (FIG. 2) by the projection lens 160.

The color filters 490a to 490c are appropriately exchanged in the filter mounting portion 490.

As shown in FIG. 2, the center axis n1 of the projection lens 160 and the normal n2 passing through the center of the inspection sheet 450 are offset from each other by a predetermined distance in the projecting section 400 of this embodiment. This offset is made to simulate a "shifting projection" state of the projector 100. The projection lens 160 is designed to project and display an image without distortion in such a shifting projection state. In general, projection in which the center axis n1 of the projection lens 160 and the normal n2 passing through the center of the inspection sheet 450 are not aligned is called "shifting projection".

Figure 8:
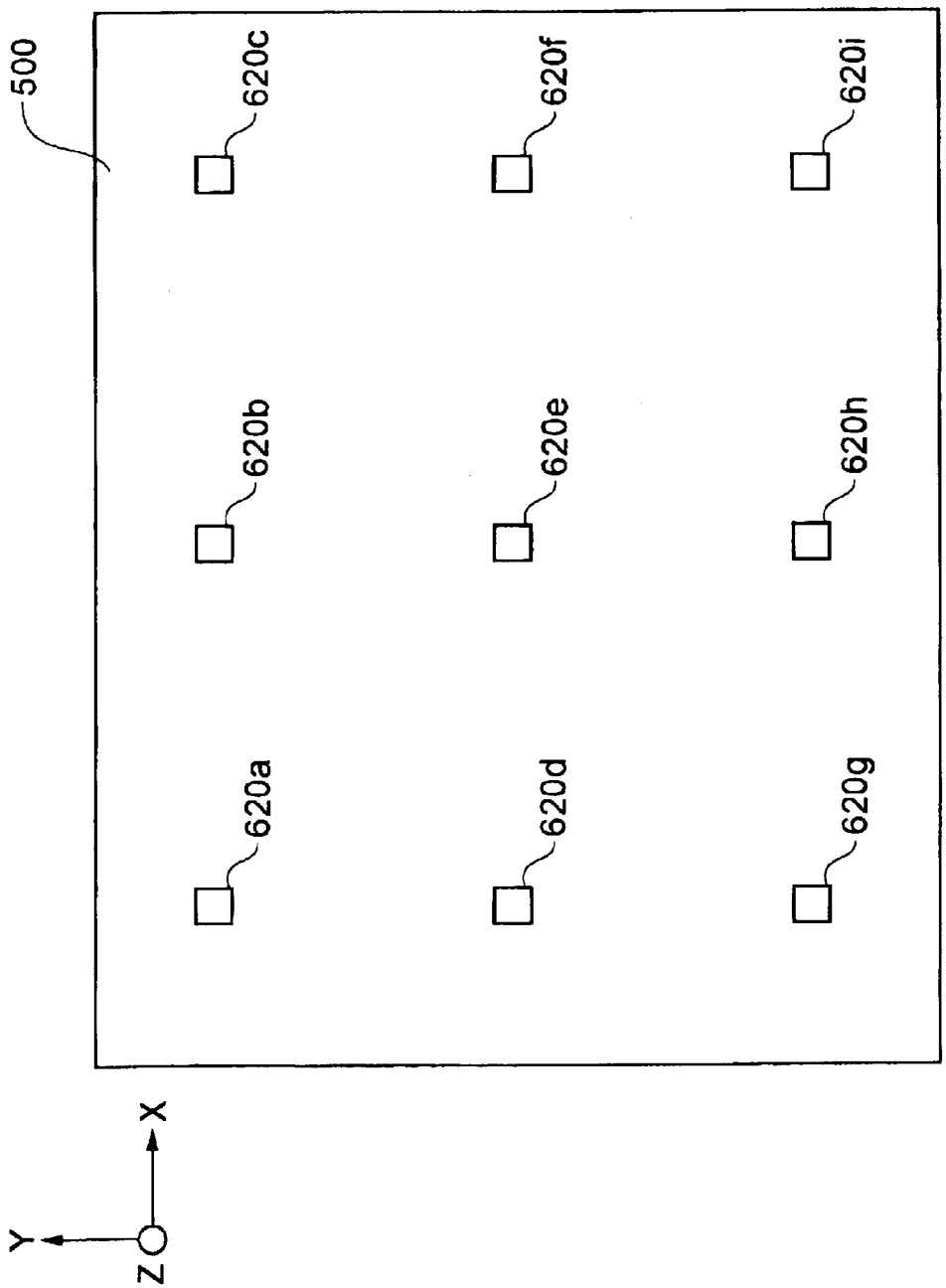
FIG. 8 is a view showing the layout of CCD cameras with respect to a screen in the embodiments.

The measuring section 600 shown in FIG. 2 includes nine CCD cameras 620a to 620i, and a processor 610 electrically connected to the nine CCD cameras 620a to 620i. Although not shown, each of the nine CCD cameras 620a to 620i has one CCD serving as an image pickup device. Each of the CCD cameras 620a to 620i captures an image, which is projected on the screen 500 through the projection lens 160, with the CCD from the side of the back surface 500b of the screen 500. FIG. 8 shows the layout of the nine CCD cameras 620a to 620i on the screen 500, as viewed from the +Z direction. As shown in FIG. 8, the nine CCD cameras 620a to 620i are fixed to the screen 500 so that they are equally spaced.

The processor 610 can include a video capture board and a computer (both not shown). The processor 610 converts images of the test pattern TP on the screen 500 captured by the nine CCD cameras 620a to 620i into image signals for the computer by the video capture board, and processes the image signals with the computer.

The computer includes a CPU (Central Processing Unit) and a hard disk, and contains programs running under an OS for controlling the CPU. The programs include a program for processing image signals corresponding to the images of the test pattern TP converted by the video capture board, and for analyzing the processed image signals. The projection lens 160 is inspected for resolution and chromatic aberration according to the program.

The computer can also be electrically connected to the hexaxial adjusting portion 444 of the projecting section 400. The programs in the computer also include a program for analyzing image signals obtained from the CCD cameras 620a to 620i and the video capture board and for controlling the hexaxial adjusting portion 444 on the basis of the analysis result. For this reason, as described above, when the program controls the hexaxial adjusting portion 444, the spatial position of the test pattern TP (FIG. 3) of the inspection sheet 450 is adjusted, and the focus state of the image is thereby adjusted.

Figure 10:
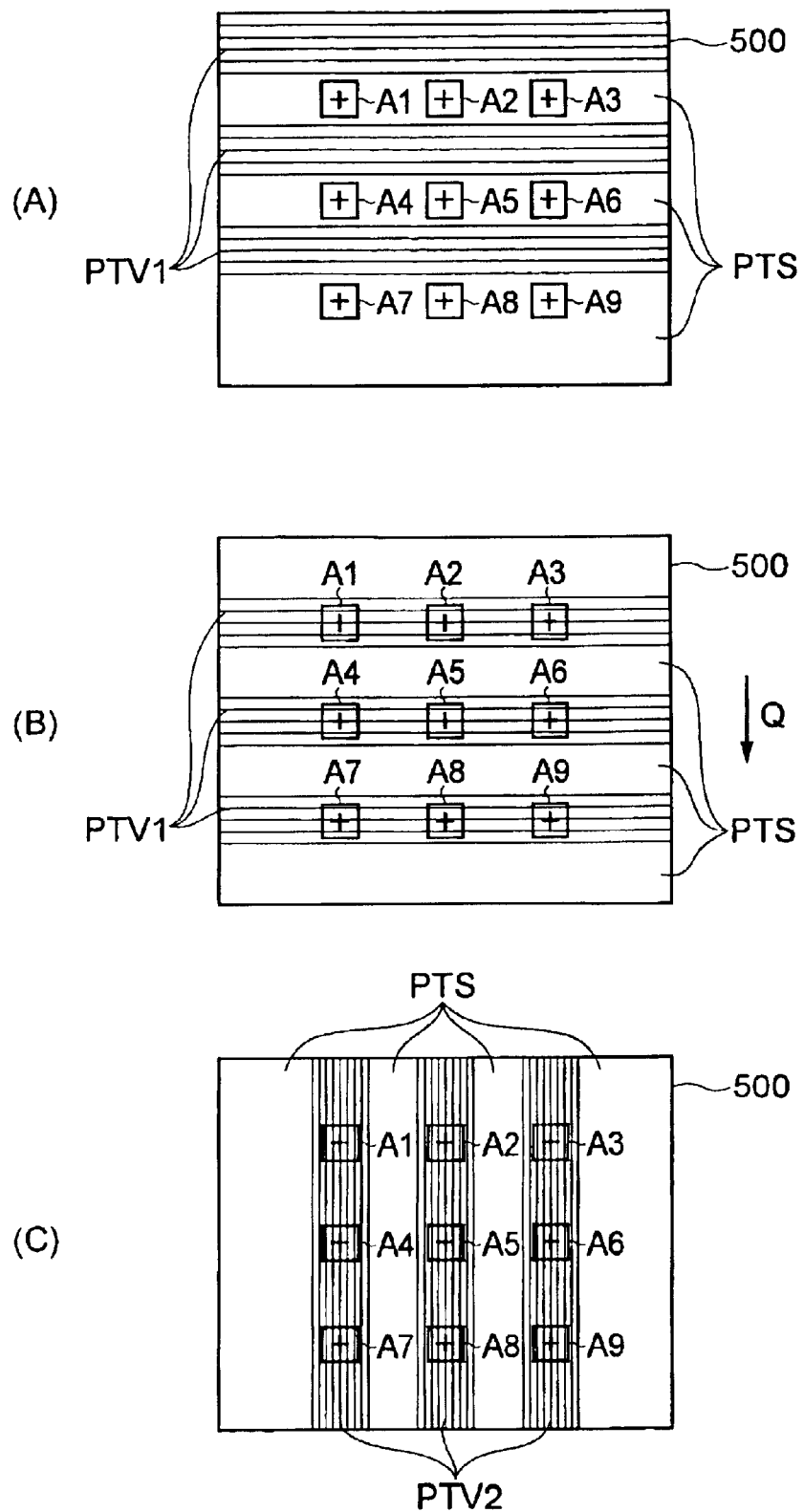
FIG. 10 is a view showing test pattern images projected on the screen in the embodiments.

The measuring regions PTV1 and PTV2 are placed at detecting positions A1 to A9 (FIG. 10) of the nine CCD cameras 620a to 620i when the test patterns TP1 and TP2 are properly held by the holding frames 448 and 449, and are projected onto the screen 500. This also applies to a case in which the rotary holding portion 442 is operated.

A method for inspecting the projection lens 160 for resolution and chromatic aberration by using the above-described projection-lens inspection apparatus 1 will be described below.

As shown in FIG. 5, inspection sheets 451 and 452, in which the light-shielding portions PTL of the test pattern TP extend horizontally, are held in the first holding frame 448 and the second holding frame 449 as prearrangement. Then, the first inspection sheet 451 held in the first holding frame 448 is placed at the light-transmissive portion 445a (FIG. 3).

Before the measurement of the optical characteristics (resolution, chromatic aberration) with the projection-lens inspection apparatus 1, an image of the test pattern TP (TP1) on the screen 500 (FIG. 2) needs to be subjected to position adjustment and focus adjustment. Regarding the position adjustment and focus adjustment of the image, referring to FIGS. 2 and 3, an image formed on the screen 500 corresponding to the test pattern TP (TP1) of the inspection sheet 450 (451) is captured by the CCD cameras 620a to 620i, and focus adjustment and position adjustment are performed by the processor 610. When the focus adjustment and position adjustment are completed, and a focused image is formed at a predetermined position on the screen 500, the resolution and chromatic aberration are measured by using the image.

Figure 9:
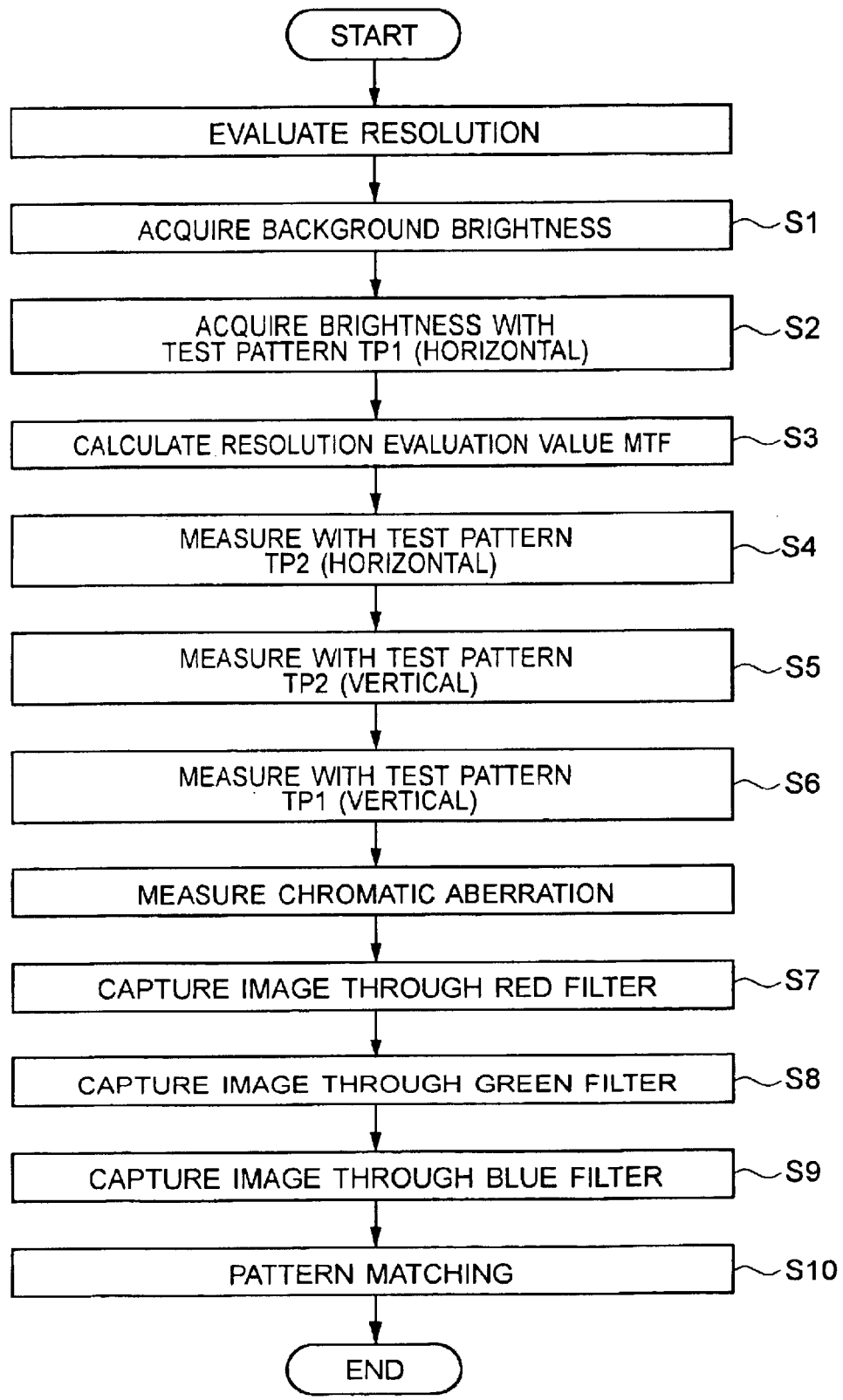
FIG. 9 is a flowchart explaining an inspection method for the projection lens in the first embodiment.

Resolution evaluation is carried out according to process described in the flowchart shown in FIG. 9i. During the resolution evaluation, none of the color filters 490a to 490c are placed in the optical path L (FIG. 3) in the filter mounting portion 490. The following description will be given also with reference to FIGS. 5, 6, and 10.

First, in order to remove the offset in the video capture board, the first inspection sheet 451 held in the first holding frame 448 is moved slightly via the sliding portion 446 (FIG. 5), as shown in FIG. 10(A), so that the measuring regions PTV1 of the first inspection sheet 451 are shifted outside the detecting positions A1 to A9 of the CCD cameras 620a to 620i. In this shifted state, the brightnesses of the light-transmissive regions PTS, which serve as background portions, are measured at the detecting positions A1 to A9, thereby acquiring brightnesses Io1 to Io9 of the background portions at the detecting positions A1 to A9 (Step S1).

In other words, the background brightnesses Io1 to Io9 are held at the detecting positions A1 to A9, respectively, and are stored in a memory of the above-described computer that constitutes the processor 610. The MTF serving as the resolution evaluation value, which will be described later, is calculated on the basis of the background brightnesses Io1 to Io9 corresponding to the desired detecting positions A1 to A9.

When the first inspection sheet 451 held in the first holding frame 448 is returned to its initial position (to the light-transmissive portion 445a), an image shown in FIG. 10(B) is projected on the screen 500. Then, the brightnesses of the measuring regions PTV1 are acquired at the detecting positions A1 to A9 of the nine CCD cameras 620a to 620i (Step S2). In the image processing by the processor 610 of this embodiment, the brightness of the image is represented with 256 grayscale levels, the darkest portion is at level 0, and the brightest portion is at level 255.

More specifically, at each of the detecting positions A1 to A9 of the CCD cameras 620a to 620i, the brightnesses detected in one pixel line along the extending direction of the measuring regions PTV1 are added together, and the total brightness is averaged by being divided by the total number of pixels. The average value serves as a representative brightness of the pixel line along the extending direction of the measuring regions PTV1. This operation is repeated in the direction in which the measuring regions PTV1 and the light-transmissive regions PTS are arrayed, that is, in the Q-direction in FIG. 10(B), thereby acquiring a representative brightness at each of the detecting positions A1 to A9. In this way, the maximum brightness Imax and the minimum brightness Imin are acquired. The brightnesses Imax and Imin are stored in the memory of the computer that constitutes the processor 610.

When the background brightness Io, the maximum brightness Imax, and the minimum brightness Imin are obtained in the above manner, the processor 610 calculates the MTF serving as the resolution evaluation value according to Equation 2 (Step S3).

$$MTF=(Imax-Imin)/(Io\times 2-Imax-Imin) \qquad \text{[Equation 2]}$$

In cases in which the test pattern TP1 (horizontal) placed at the light-transmissive portion 445a is replaced with the other three types of test patterns TP (one type of test pattern TP1 having vertical light-shielding portions, and two types of test patterns TP2) by using the rotary holding portion 442 and the sliding holding portion 443, the MTF serving as the resolution evaluation value is calculated in a procedure similar to the above.

More specifically, the second holding frame 449 having the second inspection sheet 452 is slid and placed at the light-transmissive portion 445a of the rotary-holding-portion body 445, instead of the first holding frame 448. That is, the second inspection sheet 452 having the test pattern TP2 in which the light-shielding portions PTL extend horizontally is placed at the light-transmissive portion 445a. In this state, the MTF of the projection lens 160 serving as the resolution evaluation value is obtained in a manner similar to the above (Step S4).

Subsequently, as shown in FIG. 6, the rotary-holding-portion body 445 of the rotary holding portion 442 is rotated by 90° in this state so that the light-shielding portions PTL in the test pattern TP2 of the second inspection sheet 452 extend vertically. In this state, the MTF of the projection lens 160 serving as the resolution evaluation value is obtained, in a manner similar to the above (Step S5).

Finally, the first holding frame 448 having the first inspection sheet 451 is slid and placed at the light-transmissive portion 445a of the rotary-holding-portion body 445 via the sliding portion 446, instead of the second holding frame 449, in a manner similar to the above. That is, the first inspection sheet 451 having the test pattern TP1 in which the light-shielding portions PTL extend vertically is placed at the light-transmissive portion 445a. In this case, an image shown in FIG. 10(C) is projected on the screen 500. In this state, the MTF of the projection lens 160 serving as the resolution evaluation value is obtained, in a manner similar to the above (Step S6).

In this way, the MTFs of the projection lens 160 serving as the resolution evaluation values for four types of test patterns TP (TP1, TP2) are obtained.

Subsequently, chromatic aberration is measured in the following procedure. One of the color filters 490a to 490c mounted in the filter mounting portion 490, for example, the red filter 490a, is selected, the selected red filter 490a is placed in the optical path L, and an image is projected onto the screen 500 through the red filter 490a. In this state, the image is captured at the detecting positions A1 to A9 of the CCD cameras 620a to 620i (Step S7).

Next, the filter mounting portion 490 is rotated in the direction shown by arrow A in FIG. 3 so that a color filter of another color, for example, the green filter 490b, is placed in the optical path L to replace the red filter 490a. An image projected through the green filter 490b is captured by the CCD cameras 620a to 620i, in a manner similar to the above (Step S8).

The blue filter 490c serving as the remaining filter is also subjected to a similar processing (Step S9).

While the processing is performed in the order of the red filter 490a, the green filter 490b, and the blue filter 490c, the order of the processing is not specifically limited to this.

Next, three captured images for the color filters 490a to 490c are subjected to pattern matching so as to calculate the degree of displacement among the three images (Step S10). Chromatic aberration is measured by calculating this degree of displacement.

While the method in which the focusing readjustment operation is performed for each color provides high inspection precision, the focusing readjustment does not need to be made for each color during a simple inspection.

The above-described first embodiment provides at least the following advantages. Since the orientation of the test pattern TP is changed by operating the rotary holding portion 442 after the inspection sheet 450 having the test pattern TP is loaded in the holding frame 447, the resolution of the projection lens 160 can be evaluated with one-type of test pattern TP projected on the screen 500 in the states in which the light-shielding portions PTL extend in two directions, that is, the vertical and horizontal directions. For this reason, the number of types of inspection sheets 450 to be prepared can be reduced, and the cost of the inspection sheets 450 can be reduced. In this case, simply by rotating the rotary holding portion 442, the resolution evaluation can be easily switched to a resolution evaluation with the inspection sheet 450 in which the light-shielding portions PTL extend in a different direction, and this can shorten the inspection time. In other words, the inspection operation can be simplified.

Further, since different types of inspection sheets 451 and 452 are held in the first holding frame 448 and the second holding frame 449, respectively, and the holding frames 448 and 449 are slid and positioned by operating the sliding portion 446, it is possible to easily switch between the inspection sheets 451 and 452 to be placed at the light-transmissive portion 445a, and this easily shortens the inspection time. Again, the inspection operation can be simplified.

Additionally, simply by operating the rotary holding portion 442 and the sliding holding portion 443 in a state in which the inspection sheets 451 and 452 having different types of test patterns TP1 and TP2 are placed in the first holding frame 448 and the second holding frame 449, MTFs of four types of test patterns TP1 and TP2 (horizontal and vertical) serving as the resolution evaluation values can be found using two types of test patterns TP1 and TP2. This makes it possible to reduce the number of inspection sheets 451 and 452 to be prepared, and to reduce the cost of the inspection sheets 451 and 452. Since the inspection sheets 451 and 452 are first precisely mounted, inspection can be easily performed by using all four types of test patterns TP (TP1, TP2) without replacing the inspection sheets 451 and 452, and this simplifies the inspection operation and shortens the inspection time.

Since the position of the inspection sheet 450 (451, 452) is adjusted beforehand so that an image of the test pattern TP (TP1, TP2) is properly projected at the detecting positions A1 to A9 of the nine fixed CCD cameras 620a to 620i, an image pickup device, such as a CCD camera, does not to be moved to the detecting positions A1 to A9 for the image of the test pattern TP projected on the screen 500, which was necessary before. This can shorten the inspection time.

Since the outer size of the test pattern TP is set to be larger than the size of the largest model of the liquid crystal panels for use in various projectors, a single inspection sheet 450 can also function as a plurality of types of inspection sheets 450 having different outer sizes, regardless of the size of the liquid crystal panel, and this reduces the cost of the inspection sheet 450. Since the inspection sheet 450 can be used for various models, even when the outer size of the liquid crystal panel is changed in response to the replacement of a lens to be inspected, the inspection sheet 450 does not need to be replaced, and the inspection time can be easily shortened. In other words, the inspection operation can be simplified.

Since the test patterns TP1 and TP2 have the measuring regions PTV1 and PTV2, and the light-transmissive regions PTS, the brightnesses of the measuring regions PTV1 and PTV2 and the brightnesses of the light-transmissive regions PTS can be substantially simultaneously measured by using the same inspection sheets 451 and 452, and the MTF serving as the resolution evaluation value can be easily found from the above-described Equation 2. Since such an MTF serving as the resolution evaluation value is not influenced by the model of the projector, the position of the display image, and the like, the resolution of the projection lens 160 can be more properly evaluated.

Since the filter mounting portion 490 in which the color filters 490a to 490c of three colors are placed is adopted, the chromatic aberration of the projection lens 160 can be easily measured in the processor 610 on the basis of image signals corresponding to the colors simply by mounting the color filters 490a to 490c of three colors in the filter mounting portion 490 and alternatively placing the color filters 490a to 490c in the optical path L. Since the color filters 490a to 490c and the filter mounting portion 490 can be produced at a relatively lower cost than preparing an image pickup device for each of the three colors, the cost of measuring the chromatic aberration of the lens can be reduced.

Since the inspection sheet 450 and the test pattern TP are substantially square, the inspection sheet 450 can be more conveniently rotated by 90° than in a case in which they are rectangular.

A second embodiment of the present invention will be described below with reference to the drawings. Components identical with or corresponding to those in the above first embodiment are denoted by the same reference numerals, and descriptions thereof are omitted or simplified. Since a projector incorporating a projection lens 160 is the same as that in the first embodiment, a description thereof is omitted.

A projection-lens inspection apparatus 2 of the second embodiment is substantially similar to the projection-lens inspection apparatus 1 of the first embodiment shown in FIG. 2. However, the second embodiment adopts 3-CCD cameras 630a to 630i each having a prism 81 and three image pickup devices, instead of the nine CCD cameras 620a to 620i of the first embodiment, which is different from the first embodiment in which the color filters 490a to 490c and the filter mounting portion 490 are prepared in order to measure the chromatic aberration. Corresponding thereto, processing by a processor 610 is partially different. Since other features of the projection-lens inspection apparatus 2 are common to those in the first embodiment, only the differences from the first embodiment will be described.

Figure 11:
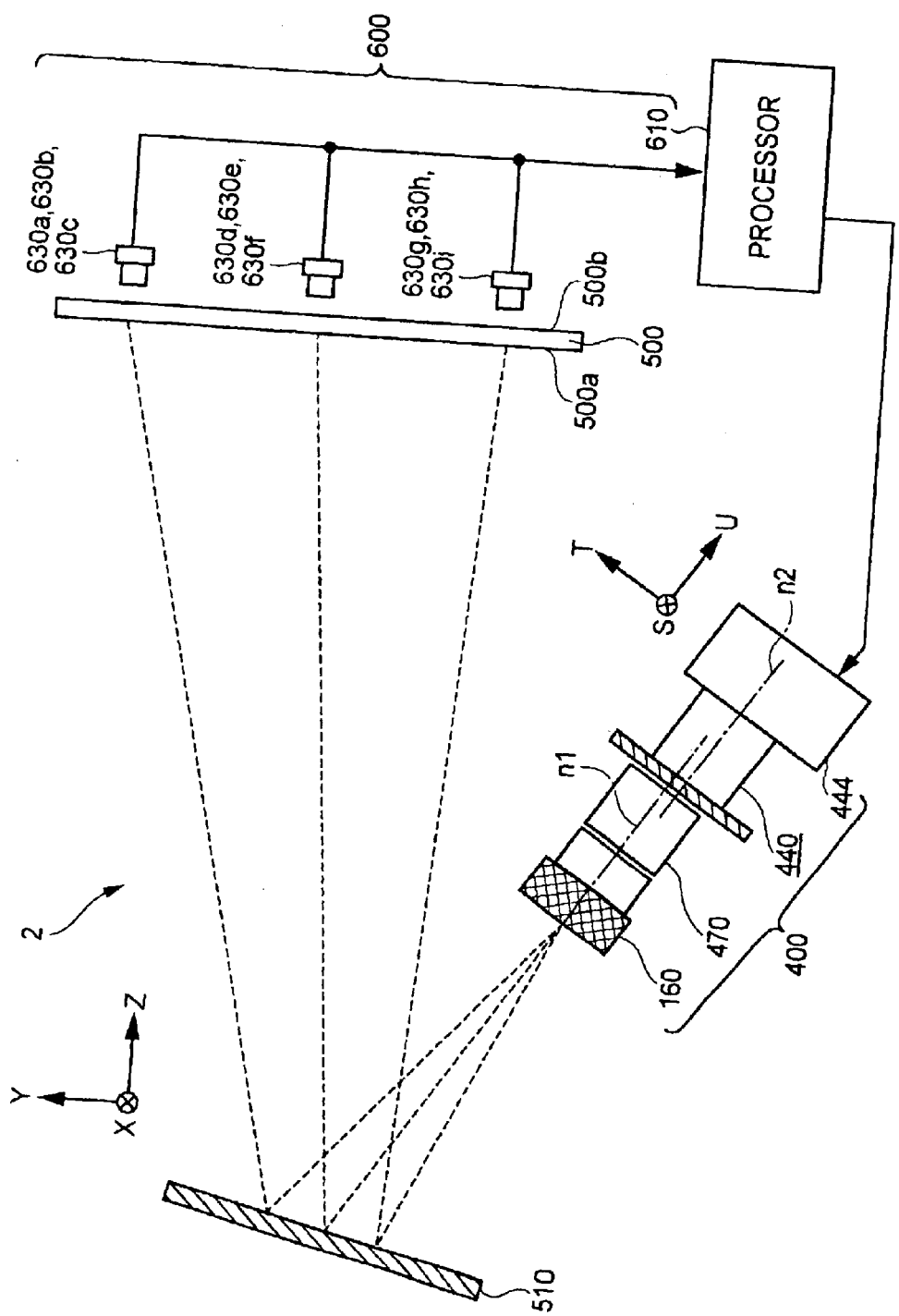
FIG. 11 is a schematic view showing the configuration of a projection-lens inspection apparatus according to a second embodiment of the present invention.
Figure 12:
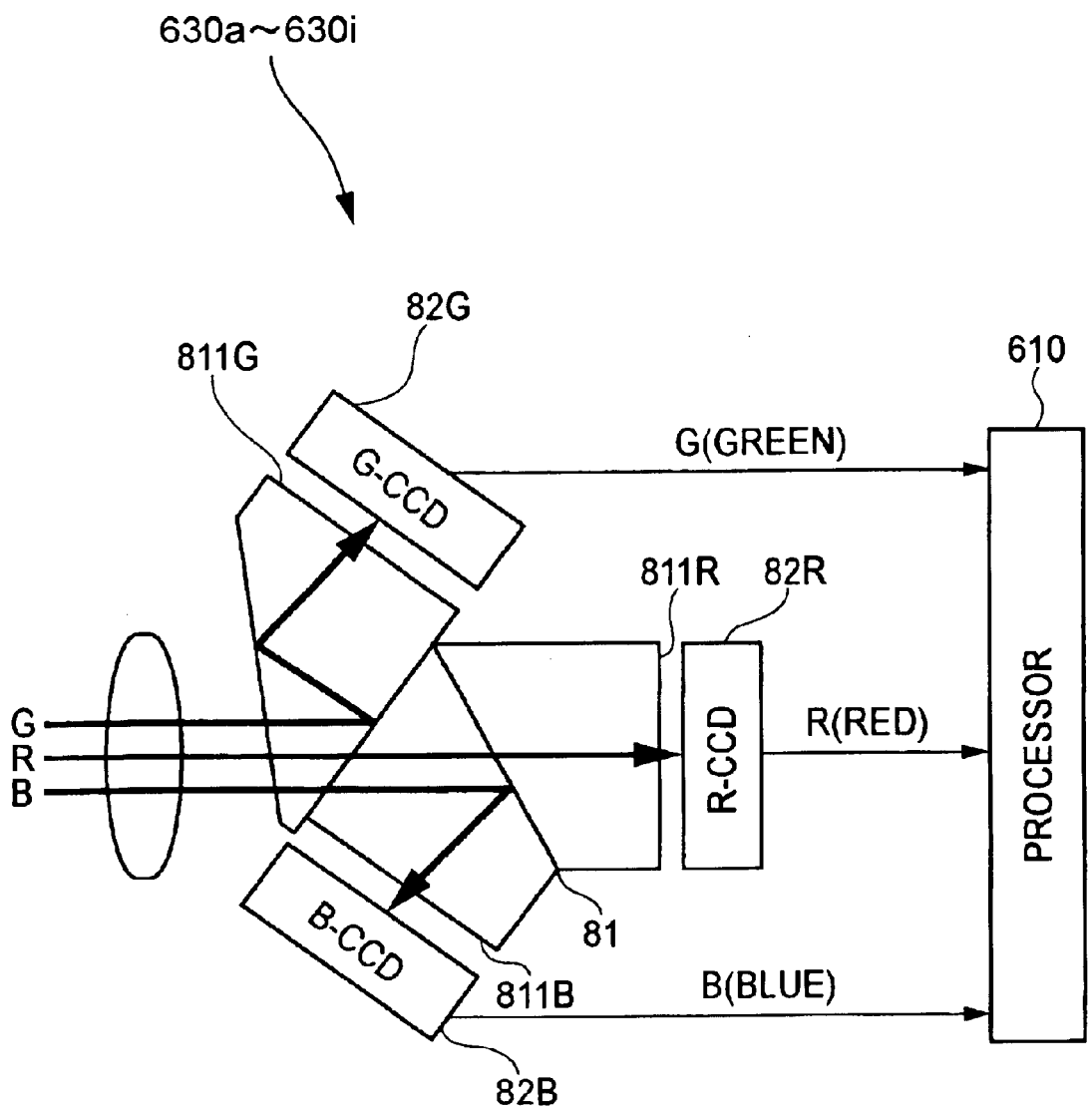
FIG. 12 is a schematic view of a 3-CCD camera in the second embodiment.

As shown in FIGS. 11 and 12, nine 3-CCD cameras 630a to 630i each have a color-separation dichroic prism 81 serving as a prism that separates an image of a test pattern TP (FIG. 3) projected on a screen 500 into three different colored light beams, that is, red light R, green light G, and blue light B. A red image pickup device (R-CCD) 82R, a green image pickup device (G-CCD) 82G, and a blue image pickup device (B-CCD) 82B for capturing the color light images are provided at light-emergent end faces 811R, 811G, and 811B of the color-separation dichroic prism 81.

As shown in FIG. 12, the color-separation dichroic prism 81 can be formed by bonding three prisms of a predetermined shape, and has a function of separating incident image light into three colored light beams, and emitting these light beams in three directions. In other words, the color-separation dichroic prism 81 has a function opposite from that of the crossed dichroic prism 150 used in the projector 100.

The image pickup devices 82R, 82G, and 82B and the processor 610 are electrically connected, and images captured by the image pickup devices 82R, 82G, and 82B are processed by the processor 610.

The resolution of a projection lens 160 is evaluated in a manner substantially similar to that in the first embodiment except that only an image captured by one of the three image pickup devices 82R, 82G, and 82B, for example, the image pickup device 82R, is adopted in the processor 610. In other words, referring to FIGS. 3 and 11, a light beam from a light-source device 410 travels through an inspection sheet 451 or 452 (FIG. 5) and the projection lens 160, and an image of a test pattern TP1 or TP2 of the inspection sheet 451 or 452 is thereby projected on a screen 500. The projected image is captured by the nine 3-CCD cameras 630a to 630i, and is processed by the processor 610, in a manner similar to that in the first embodiment. In this way, the background brightness Io, the maximum brightness Imax, and the minimum brightness Imin are acquired, and the MTF (Modulation Transfer Function) is found from the above-described Equation 2.

Next, chromatic aberration is measured in the following procedure. That is, referring to FIGS. 3 and 11, first, an image of the test pattern TP projected on the screen 500 is substantially simultaneously captured by the image pickup devices 82R, 82G, and 82B in each of the 3-CCD cameras 630a to 630i. Subsequently, image signals corresponding to the three captured images are generated by the processor 610, and pattern matching similar to the above is performed on the basis of the three image signals so as to calculate the degree of displacement among the three images, in a manner similar to the above. In this way, the chromatic aberration of the projection lens 160 is measured.

Since such a method is different from the above-described method in which the focus readjustment is performed for each color, but is close to a method in which the focus readjustment is not performed, advantages equivalent to those in the above can be achieved by extending the inspection time and performing the focus adjustment for each color.

The second embodiment provides the following advantage in addition to the above advantages of the first embodiment.

In particular, an image of the test pattern TP1 or TP2 projected on the screen 500 is captured by the 3-CCD cameras 630a to 630i, and the chromatic aberration of the projection lens 160 can be easily measured in a short time on the basis of the images respectively captured by the three image pickup devices 82R, 82G, and 82B in each of the 3-CCD cameras 630a to 630i. Moreover, since color light images are simultaneously captured by the image pickup devices 82R, 82G, and 82B, the color filters 490a to 490c do not need to be alternatively placed in the optical path, which is necessary in the above first embodiment, and this can shorten the time taken to measure the chromatic aberration of the projection lens 160.

A third embodiment of the present invention will be described below with reference to the drawings. Components identical with or corresponding to those in the above first embodiment are denoted by the same reference numerals, and descriptions thereof are omitted or simplified. Since a projector incorporating a projection lens 160 is the same as that in the above first embodiment, a description thereof is omitted.

A projection-lens inspection apparatus 3 of the third embodiment is different from the projection-lens inspection apparatus 1 of the first embodiment show in FIG. 2 in that image light emitted from a projection lens 160 is directly projected onto a screen 500 without using a mirror 510.

Figure 13:
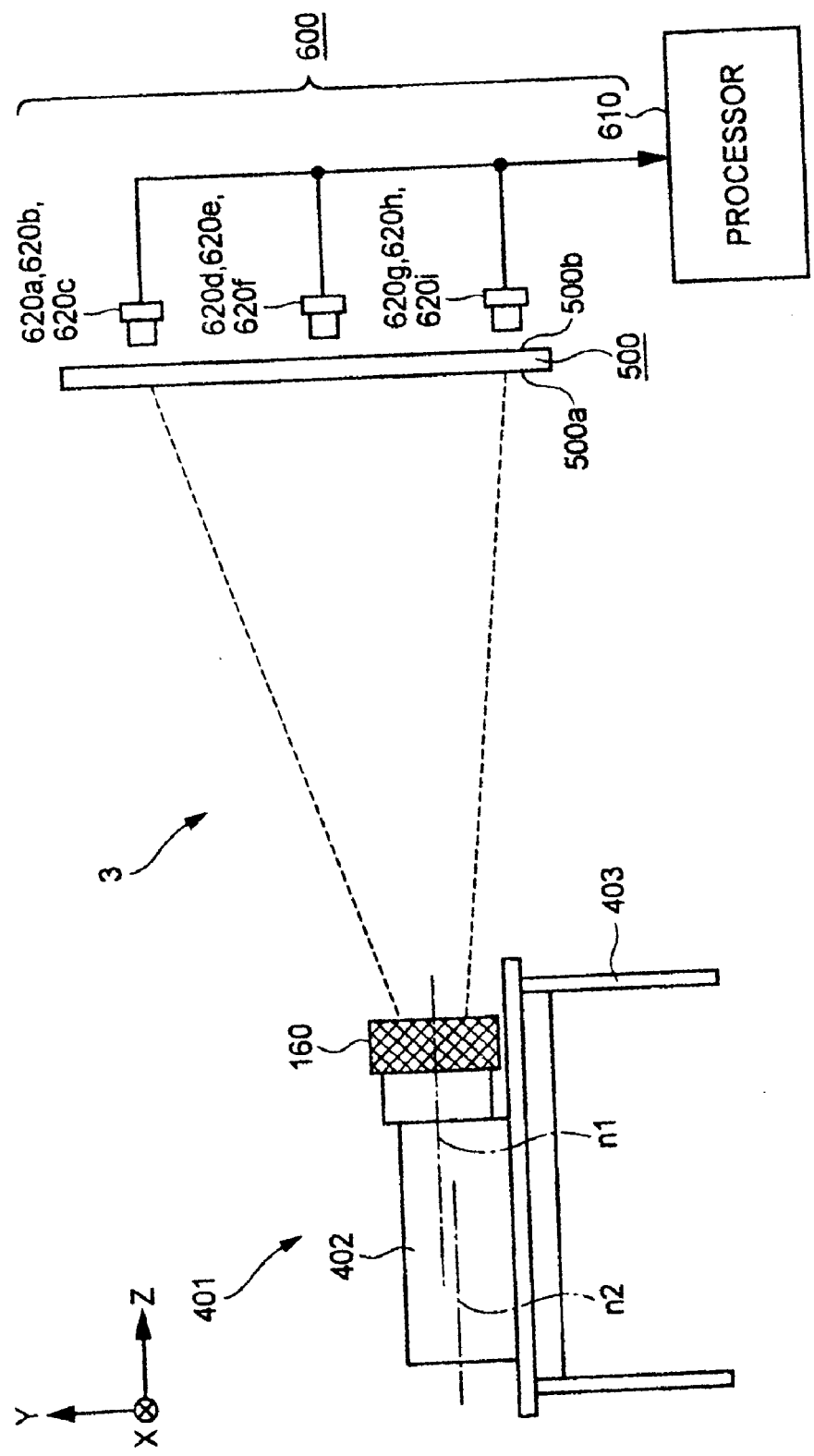
FIG. 13 is a schematic view showing the configuration of a projection-lens inspection apparatus according to a third embodiment of the present invention.

As shown in FIG. 13, the projection-lens inspection apparatus 3 can include a projecting section 401 in which a projection lens 160 to be inspected is mounted, a screen 500, and a measuring section 600. In the projection-lens inspection apparatus 3, image light emitted from the projecting section 401 is directly projected onto the screen 500, and the image light projected on the screen 500 is captured and processed by the measuring section 600 from the side of a back surface 500b of the screen 500, thereby inspecting the projection lens 160 for resolution, chromatic aberration, and the like.

As shown in FIG. 13, the projecting section 401 includes, besides the projection lens 160 to be inspected, an optical device 402 for supporting the projection lens 160 and for emitting a predetermined light beam to the projection lens 160, and a mount table 403 fixed at a predetermined position with the optical device 402 fixed on an upper surface thereof. The optical device 402 is fixed on the mount table 403 in a state in which image light projected from the optical device 402 through the projection lens 160 is subjected to focus adjustment and position adjustment so that the image light is properly projected onto the screen 500.

Figure 14:
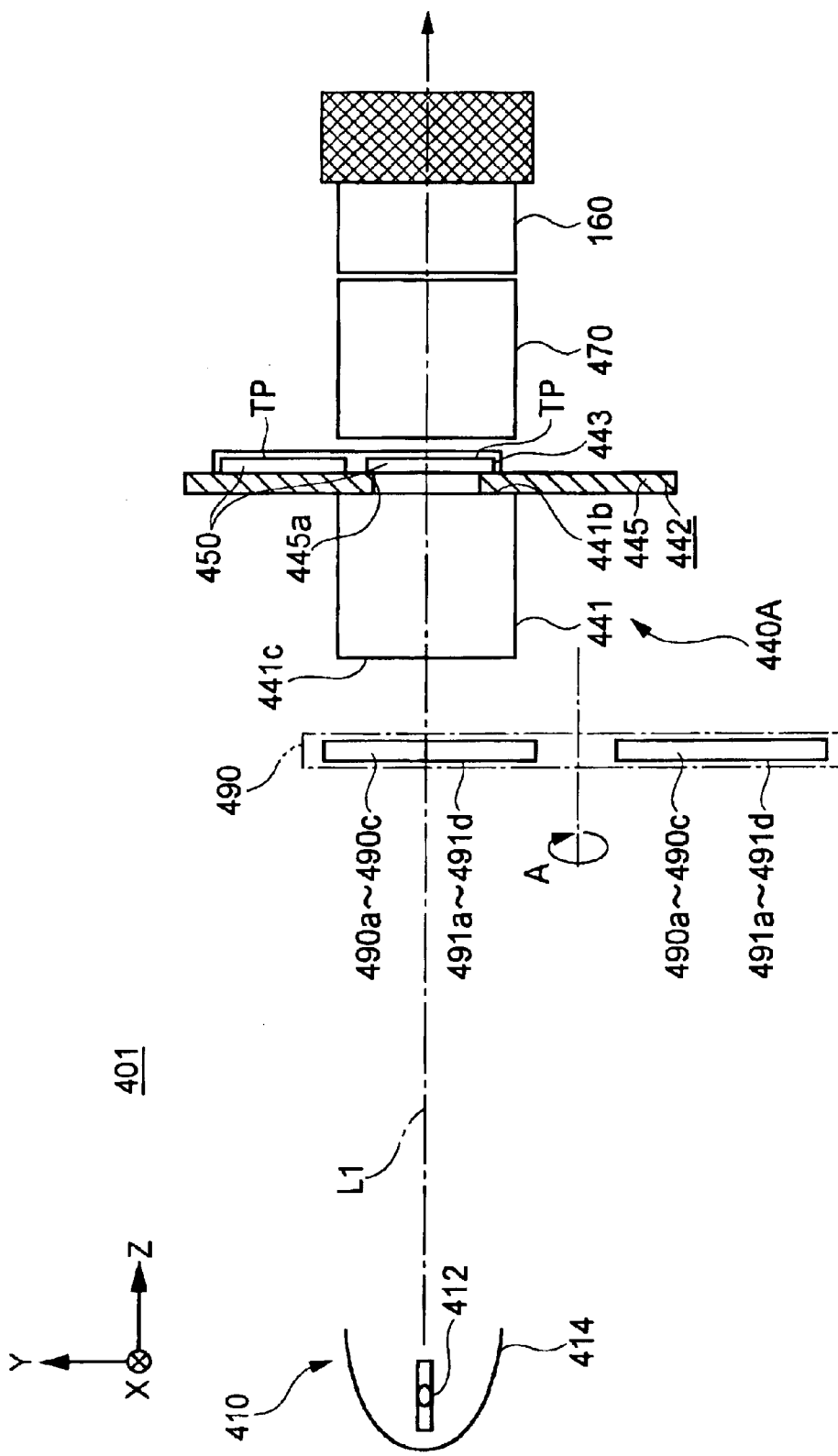
FIG. 14 is a schematic view showing the configuration of the projection-lens inspection apparatus of the third embodiment.

As shown in FIG. 14, the optical device 402 includes a light-source device 410, an inspection sheet 450, an inspection-sheet holder 440A for holding the inspection sheet 450, a dummy prism 470, a filter mounting portion 490, and color filters 490a to 490c to be mounted in the filter mounting portion 490.

The projecting section 401 is different from the projecting section 400 of the first embodiment in that an optical path L1 of a light beam from the light-source device 410 is linear (linear optical system), unlike the angular-C-shaped optical path L of a light beam from the light-source device 410. That is, the projecting section 401 is different from the projecting section 400 in the structure of the inspection-sheet holder 440A, and the positions of the light-source device 410 and the filter mounting portion 490 with respect to the inspection-sheet holder 440A. The projecting section 401 is substantially similar to that in the first embodiment except for these differences.

The light-source device 410 and the filter mounting portion 490 are substantially linearly arranged with respect to the inspection-sheet holder 440A, as shown in FIG. 14. That is, the projection lens 160 and the components 410, 450, 440A, 470, 490, and 490a to 490c are arranged in a substantially linear manner.

As shown in FIG. 14, the inspection-sheet holder 440A serves to hold the inspection sheet 450 at a predetermined position, and includes a holder body 441, a rotary holding portion 442 disposed on a +Z side face (right side face in FIG. 14) of the holder body 441, and a sliding holding portion 443 mounted on a +Z side face of the rotary holding portion 442 so as to hold the inspection sheet 450. The inspection-sheet holder 440A does not have the above-described hexaxial adjusting portion 444.

An opening 441c like the above opening 441a is formed in a −Z side face (left side face in FIG. 14) of the holder body 441. The above-described opening 441b is formed in the +Z side face.

With the above configuration of the projecting section 401, a light beam emitted from the light-source device 410 sequentially passes through the filter mounting portion 490 and the inspection sheet 450 (451, 452), and is thereby emitted as image light representing an image of a test pattern (TP1, TP2 in FIG. 5), as shown by the optical path L1 in FIG. 14. The image light passes through the dummy prism 470, is projected from the projection lens 160, and is projected onto the screen 500 (FIG. 13). The color filters 490a to 490c are appropriately and alternatively placed in the optical path L1 in the filter mounting portion 490.

As shown in FIG. 13, "shifting projection" is performed in the projecting section 401, in a manner similar to that in the projecting section 400 of the first embodiment.

Inspection can be made with the projection-lens inspection apparatus 3 in a procedure substantially similar to that of the inspection with the projection-lens inspection apparatus 1 of the first embodiment. However, the inspection with the projection-lens inspection apparatus 3 is different in that presetting in the first embodiment is unnecessary because the projecting section 401 is fixed beforehand at a predetermined position with respect to the screen 500 and a projected image is subjected to the position and focus adjustment. Since other inspection processes are similar, descriptions thereof are omitted.

The third embodiment also provides the following advantage in addition to the advantages of the first embodiment. Additionally, since the projection-lens inspection apparatus 3 is structured as a linear optical system, a reflecting mirror or the like is unnecessary. Therefore, the number of components can be reduced, and a relatively simple configuration is possible.

It should be understood that the present invention is not limited to the above embodiments, and covers modifications, improvements, and the like that can achieve the object of the invention.

For example, while the rotating angle of the rotary-holding-portion body 445 is set at 90° in the above embodiments, for example, it may be set at other angles, 45°. In short, it is satisfactory as long as the held inspection sheet 450 can be rotated and the extending direction of the light-shielding regions PTL in the test pattern TP can be changed.

The outer shape of the inspection sheet 450 and the test pattern TP is not limited to a substantially square shape, but may be other shapes, for example, a rectangular shape including an oblong shape, or a circular shape.

While the rotary-holding-portion body 445 of the rotary holding portion 442 is shaped like a circular disk in the above embodiments, it may have other shapes, for example, a rectangular shape. In short, the material, size, shape, and the like of the rotary holding portion 442 are not limited as long as the rotary holding portion 442 can rotate with the inspection sheet 450 mounted therein.

While the sliding holding portion 443 slides inside the rotary-holding-portion body 445 in the above embodiments, it may protrude from the rotary-holding-portion body 445. It should be understood that the material, size, shape, and the like of the sliding holding portion 443 are not limited.

While the two holding frames 448 and 449 adjoin as the holding frames 447 in the above embodiments, the number of the holding frames 447 may be more than three or one. In short, the number of holding frames 447 is not limited. The holding frames 447 may be spaced from each other so that they do not adjoin.

While the holding frame 447 has the fixed holding pieces 447a and the movable holding piece 447b in order to hold the inspection sheets 451 and 452 in the above embodiments, the movable holding piece 447b may be replaced with a fixed holding piece, and the fixed holding pieces 447a may be replaced with movable holding pieces. In short, the structures of the holding device is not specifically limited as long as it can reliably hold the inspection sheets 451 and 452.

While the nine CCD cameras 620a to 620i or the nine 3-CCD cameras 630a to 630i are fixedly placed for the screen 500 in the above embodiments, the number of cameras may be other number, for example, four or twenty. The cameras do not need to be equally spaced with respect to the screen 500, which is necessary in the above embodiments. In short, it is only necessary that a plurality of cameras are fixedly arranged at predetermined positions with respect to the screen 500.

While the CCD cameras 620a to 620i or 3-CCD cameras 630a to 630i are fixed, some of them or all of them do not need to be fixed.

While the MTF serving as the resolution evaluation value is found from Equation 1 (Equation 2) in the above embodiments, it may be calculated according to another equation. In short, it is only necessary to properly evaluate the resolution of the projection lens.

While the two inspection sheets 451 and 452 have the test patterns TP1 and TP2 in which the spatial frequency is 50 lines per millimeter and 80 lines per millimeter in the above embodiments, inspection sheets having other spatial frequencies may be adopted. In this case, the spatial frequency may be other values, for example, 20 lines per millimeter or 60 lines per millimeter.

While the horizontal test pattern TP1, the horizontal test pattern TP2, the vertical test pattern TP2, and the vertical test pattern TP1 are used for inspection in that order during the resolution evaluation in the above embodiments, the inspection order is not specifically limited. While the chromatic aberration is measured after the resolution is measured, this order is also not specifically limited. In short, the measurement items may be measured at arbitrary timings as long as both the resolution and chromatic aberration are measured.

While the projection lens 160 is inspected in the above embodiments, another optical system that constitutes the projector, or an optical system for use in an electronic device other than the projector may be inspected.

The above-described present invention makes it possible to simply evaluate the resolution of the lens at low cost.

What is claimed is:

1. A lens inspection apparatus for inspecting a lens in order to evaluate the resolution of the lens by projecting image light containing a test pattern for resolution measurement onto a screen through the lens, and displaying an image of the test pattern for resolution measurement on the screen, comprising:

an inspection sheet having the test pattern for resolution measurement;

an inspection-sheet holder that holds the inspection sheet;

a light source that introduces a light beam to the test pattern of the inspection sheet held by the inspection-sheet holder; and an image-light detecting section having an image pickup device that captures an image projected on the screen through the inspection sheet, and the test pattern including a measuring region in which linear light-shielding portions are arranged in stripes in order for transmitted light to have a predetermined spatial frequency, the inspection-sheet holder including a holder body having an opening forming a light-transmissive section corresponding to the test pattern of the inspection sheet that positions the inspection sheet at a focal position of the lens, the inspection-sheet holder including a rotary holding portion having a light-transmissive portion, and the rotary holding portion holding the inspection sheet so that the inspection sheet rotates in a plane relative to the holder body.

2. The lens inspection apparatus according to claim 1, the inspection-sheet holder including a sliding holding portion that holds a plurality of inspection sheets having test patterns of different spatial frequencies, and that holds the inspection sheets so that the inspection sheets slide in a plane relative to the holder body.

3. The lens inspection apparatus according to claim 1, the image-light detecting section including a plurality of image pickup devices that capture an image projected on the screen, and the plurality of image pickup devices are fixed to the screen.

4. The lens inspection apparatus according to claim 1, further comprising:

a filter mounting portion in which color filters that transmit only a light beam having a wavelength within a predetermined range from among light beams emitted from the light source.

5. The lens inspection apparatus according to claim 1, the image-light detecting section having a prism that separates the image light projected on the screen into a plurality of colored light beams, and the image pickup device being placed at each of light-emergent end faces of the prism corresponding to the colored light beams.

6. A rectangular inspection sheet having a test pattern for resolution measurement on an upper surface thereof, and placed upstream from a lens in an optical path so as to evaluate a resolution of the lens by projecting image light containing the test pattern for resolution measurement onto a screen through the lens and displaying an image of the test pattern for resolution measurement on the screen, the inspection sheet having a measuring region in which a plurality of linear light-shielding portions are arranged continuously in stripes extending between a pair of opposing edges.

7. The inspection sheet according to claim 6, a plurality of the measuring regions being arranged in the extending direction of the pair of edges, and a light-transmissive region that does not have the light-shielding portions being formed between adjoining measuring regions.

* * * * *